United States Patent
Shiba et al.

(10) Patent No.: US 11,654,360 B2
(45) Date of Patent: May 23, 2023

(54) NON-TRANSITORY COMPUTER-READABLE MEDIUM AND VIDEO GAME PROCESSING SYSTEM

(71) Applicant: SQUARE ENIX CO., LTD., Tokyo (JP)

(72) Inventors: Takamasa Shiba, Tokyo (JP); Hiroshi Kobayashi, Tokyo (JP); Jun Waga, Tokyo (JP); Yutaka Yoshida, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 17/455,964

(22) Filed: Nov. 22, 2021

(65) Prior Publication Data
US 2022/0168648 A1    Jun. 2, 2022

(30) Foreign Application Priority Data
Nov. 27, 2020  (JP) .............................. JP2020-197112

(51) Int. Cl.
*A63F 13/58*    (2014.01)
*A63F 13/537*    (2014.01)

(52) U.S. Cl.
CPC ............ *A63F 13/58* (2014.09); *A63F 13/537* (2014.09)

(58) Field of Classification Search
CPC ........ A63F 13/58; A63F 13/537; A63F 13/45; A63F 13/65; A63F 13/216
See application file for complete search history.

(56) References Cited

U.S. PATENT DOCUMENTS

| 6,932,698 B2* | 8/2005 | Sprogis | A63F 13/80 463/40 |
| 9,387,398 B2* | 7/2016 | Yamada | A63F 13/47 |
| 2003/0144047 A1* | 7/2003 | Sprogis | G01S 5/0072 463/9 |

(Continued)

FOREIGN PATENT DOCUMENTS

| JP | 2002095865 A | 4/2002 |
| JP | 2018064677 A | 4/2018 |
| JP | 2020074822 A | 5/2020 |

OTHER PUBLICATIONS

[English Translation] Notice of Reasons for Refusal dated Jan. 11, 2022 for Japanese Patent Application No. 2020-197112.

(Continued)

*Primary Examiner* — Steve Rowland
(74) *Attorney, Agent, or Firm* — Dorsey & Whitney LLP

(57) ABSTRACT

A non-transitory computer-readable medium including a video game processing program for causing a server to perform functions to control progress of a video game using a virtual space corresponding to map information of a real space and positional information of a user terminal of a user is provided. The functions include: an arranging function configured to arrange objects in the virtual space, at least one attribute of a plurality of attributes being associated with each of the objects; a specifying function configured to specify an object that satisfies a predetermined positional condition with respect to the positional information of the user terminal; and an updating function configured to update information regarding the user based on an attribute of the specified object.

11 Claims, 13 Drawing Sheets

(56) References Cited

U.S. PATENT DOCUMENTS

| | | | | |
|---|---|---|---|---|
| 2004/0157662 A1* | 8/2004 | Tsuchiya | ............... | A63F 13/10 463/32 |
| 2006/0105838 A1* | 5/2006 | Mullen | ............... | A63F 13/65 463/31 |
| 2007/0021166 A1* | 1/2007 | Mattila | ............... | A63F 13/12 463/1 |
| 2007/0026944 A1* | 2/2007 | Maehiro | ............... | A63F 13/10 463/31 |
| 2007/0060353 A1* | 3/2007 | Omori | ............... | A63F 13/332 463/39 |
| 2007/0099705 A1* | 5/2007 | Tanz | ............... | A63F 13/79 463/42 |
| 2007/0197273 A1* | 8/2007 | Suzuki | ............... | A63F 3/00006 463/16 |
| 2007/0225077 A1* | 9/2007 | Piccionelli | ............... | A63F 13/65 463/42 |
| 2013/0053149 A1* | 2/2013 | Rouse | ............... | H04W 4/21 463/42 |
| 2013/0288798 A1* | 10/2013 | Ruckart | ............... | A63F 13/65 463/40 |
| 2016/0253710 A1* | 9/2016 | Publicover | ............... | H04N 21/2187 705/14.66 |
| 2018/0264363 A1* | 9/2018 | Moberg | ............... | A63F 13/211 |
| 2019/0262700 A1* | 8/2019 | Nakamura | ............... | A63F 13/525 |

OTHER PUBLICATIONS

"[Dragon Quest Walk] Secret and Way of Shifting Pot [Trick]", [English Translation] AppMedia [online], https://appmedia.jp/dqwalk/4033231, Nov. 28, 2019.

"Pokémon GO", [English Translation] List of ways to evolve Eevee and Introduction of Tricks of Defined Evolution, APPBANK [online] https://www.appbank.net/2019/12/08/iphone-application/1828868.php, Dec. 8, 2019.

* cited by examiner

OBJECT RELATED INFORMATION

| Object ID | Type | Arrangement position | Attribute | ... |
|---|---|---|---|---|
| A01 | Recovery | (X1,Y1) | Flat land | ... |
| A02 | Destination | (X2,Y2) | Waterside | ... |
| A03 | Landmark | (X3,Y3) | Landmark property | ... |
| A04 | Recovery | (X4,Y4) | Food | ... |
| ⋮ | ⋮ | ⋮ | ⋮ | ... |

Fig.14

INFORMATION REGARDING USERS

| User ID | Character | | | | | | Level | ... | History information | ... |
|---|---|---|---|---|---|---|---|---|---|---|
| | Character | Type ID | Attribute information | | | | | | | |
| | | | Flat land | Waterside | ... | Landmark property | | | | |
| U01 | C01 | T03 | 3.5 | 2.0 | ... | 2.0 | 20 | ... | Green, polka dots | ... |
| U02 | C02 | T06 | 1.1 | 4.0 | ... | 2.5 | 31 | ... | Polka dots | ... |
| : | : | : | : | : | : | : | : | : | : | ... |

Fig. 15

CHARACTER TYPE RELATED INFORMATION

| Character type ID | Type name | Current type | Level | Attribute | Type name | |
|---|---|---|---|---|---|---|
| | | | | | Others | |
| T01 | Baby | None | None | None | None | ... |
| T02 | Normal | Baby | 5 | None | None | ... |
| T03 | Earth | Normal | 15 | Flat land 3, waterside 1, nature 1 | None | ... |
| T04 | Choco | Earth | 30 | Flat land 2, waterside 1, nature 3, food 1 | None | ... |
| T05 | Polka dots | Normal | 15 | Flat land 1, waterside 3, nature 1 | None | ... |
| T06 | Hoimin | Polka dots | 30 | Flat land 1, waterside 1, nature 1 | None | ... |
| T07 | Green | Normal | 15 | Flat land 1, waterside 1, nature 3 | None | ... |
| T08 | Metal | Any one of earth, polka dots, and green | 30 | Flat land 1, waterside 1, nature 1 | Experienced transforming into earth, polka dots, and green | ... |
| T09 | Metal hoimin | Metal | 50 | Flat land 1, waterside 1, nature 1 | Total number of steps is one million or more | ... |
| T10 | Landmark | Metal | 50 | Landmark property 4 | Landmark traveling rate is 50% or higher | ... |
| ... | | | | ... | ... | |

NON-TRANSITORY COMPUTER-READABLE MEDIUM AND VIDEO GAME PROCESSING SYSTEM

CROSS-REFERENCE TO RELATED APPLICATION

The present application claims priority to and the benefit of Japanese Patent Application No. 2020-197112 filed on Nov. 27, 2020, the disclosure of which is expressly incorporated herein by reference in its entirety for any purpose.

BACKGROUND

At least one of embodiments of the present disclosure relates to a non-transitory computer-readable medium including a video game processing program and a video game processing system for causing a server to perform functions to control progress of a video game using a virtual space corresponding to map information of a real space and positional information of a user terminal in response to an operation of a user.

In recent years, various systems each using positional information of a user terminal have been proposed in a field of video games.

In such a system, there is one in which a score of a user is calculated on the basis of a score map in which a score area is set in accordance with a position in a real space and positional information for specifying a position of a mobile object, for example, a user terminal. Examples of such system may be found in Japanese Patent Application Publication No. 2002-95865.

SUMMARY

In the meantime, in a system using positional information of a user terminal, there is one in which an object is arranged in a virtual space corresponding to map information of a real space, and an event is generated in accordance with a relationship between a position of the object and a position in the virtual space corresponding to positional information of a user terminal. In the conventional system, the user is encouraged to move in the real space for the purpose of generation of the event. Here, in order to maintain interest of the user in a video game, it is required to have variation in how to encourage the user to move in the real space.

It is an object of at least one of embodiments of the present disclosure to solve the problem described above, and to maintain interest of a user in a video game.

According to one non-limiting aspect of the present disclosure, there is provided a non-transitory computer-readable medium including a video game processing program for causing a server to perform functions to control progress of a video game using a virtual space corresponding to map information of a real space and positional information of a user terminal of a user.

The functions include an arranging function configured to arrange objects in the virtual space, at least one attribute of a plurality of attributes being associated with each of the objects.

The functions also include a specifying function configured to specify an object that satisfies a predetermined positional condition with respect to the positional information of the user terminal.

The functions also include an updating function configured to update information regarding the user on the basis of an attribute of the specified object.

According to another non-limiting aspect of the present disclosure, there is provided a video game processing system for controlling progress of a video game using a virtual space corresponding to map information of a real space and positional information of a user terminal of a user. The video game processing system includes a communication network, a server, and the user terminal.

The video game processing system includes an arranger configured to arrange objects in the virtual space, at least one attribute of a plurality of attributes being associated with each of the objects.

The video game processing system also includes a specifier configured to specify an object that satisfies a predetermined positional condition with respect to the positional information of the user terminal.

The video game processing system also includes an updater configured to update information regarding the user on the basis of an attribute of the specified object.

According to still another non-limiting aspect of the present disclosure, there is provided a non-transitory computer-readable medium including a video game processing program for causing a user terminal to perform functions to control progress of a video game using a virtual space corresponding to map information of a real space and positional information of a user terminal of a user.

The functions include an arranging function configured to arrange objects in the virtual space, at least one attribute of a plurality of attributes being associated with each of the objects.

The functions also include a specifying function configured to specify an object that satisfies a predetermined positional condition with respect to the positional information of the user terminal.

The functions also include an updating function configured to update information regarding the user on the basis of an attribute of the specified object.

According to each of the embodiments of the present application, one or two or more shortages are solved,

BRIEF DESCRIPTION OF DRAWINGS

The foregoing and other objects, features and advantages of the present disclosure will become more readily apparent from the following detailed description of preferred embodiments of the present disclosure that proceeds with reference to the appending drawings:

FIG. 14 is an explanatory drawing for explaining an example of a storage state of information corresponding to at least one of the embodiments of the present disclosure;

FIG. 15 is an explanatory drawing for explaining an example of a storage state of information corresponding to at least one of the embodiments of the present disclosure;

DETAILED DESCRIPTION

Hereinafter, examples of embodiments according to the present disclosure will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

First Embodiment

Figure 1:
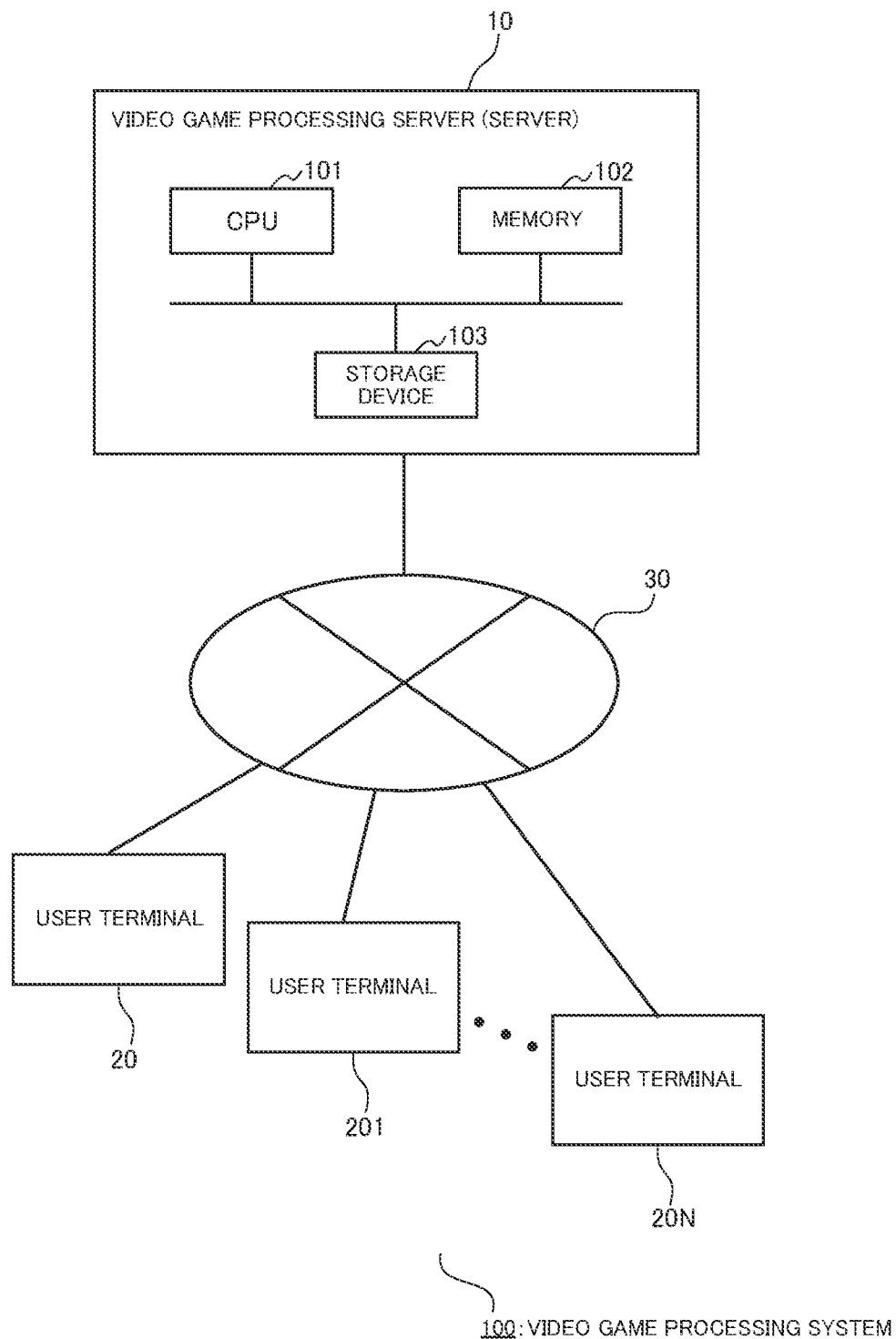
FIG. 1 is a block diagram illustrating an example of a configuration of a video game processing system corresponding to at least one of the embodiments of the present disclosure.

FIG. 1 is a block diagram illustrating an example of a configuration of a video game processing system 100 according to one embodiment of the present disclosure. As illustrated in FIG. 1, the video game processing system 100 includes a video game processing server 10 (hereinafter, referred to as a "server 10") and user terminals (or player terminals) 20, and 201 to 20N ("N" is an arbitrary integer) respectively used by users (or players) of the video game processing system 100. In this regard, the configuration of the video game processing system 100 is not limited to this configuration. The video game processing system 100 may be configured so that the plurality of users uses a single user terminal, or may be configured so as to include a plurality of servers.

Each of the server 10 and the plurality of user terminals 20 and 201 to 20N is connected to a communication network 30 such as the Internet. In this regard, although it is not illustrated in the drawings, the plurality of user terminals 20 and 201 to 20N is connected to the communication network 30 by executing data communication with base stations managed by a telecommunication carrier by means of a radio communication line.

The video game processing system 100 includes the server 10 and the plurality of user terminals 20 and 201 to 20N, whereby various kinds of functions for executing various kinds of processing in response to an operation of the user are performed.

The server 10 is managed by an administrator of the video game processing system 100, and has various kinds of functions to provide information regarding various kinds of processing to the plurality of user terminals 20 and 201 to 20N. In the present embodiment, the server 10 is constructed by an information processing apparatus, such as a WWW server, and includes a storage medium for storing various kinds of information. A configuration of the server 10 is not limited particularly so long as the server 10 includes a general configuration for executing various kinds of processes as a computer, such as a control unit and a communication unit. Hereinafter, an example of a hardware configuration of the server 10 will be described briefly.

As illustrated in FIG. 1, the server 10 at least includes a CPU (Central Processing Unit) 101, a memory 102, and a storage device 103.

The CPU 101 is a central processing unit configured to execute various kinds of calculations and controls. Further, in a case where the server 10 includes a GPU (Graphics Processing Unit), a part of the various kinds of calculations and controls may be executed by the GPU. The server 10 appropriately executes, by the CPU 101, various kinds of information processing required to control a video game by using data read out onto the memory 102, and stores obtained processing results in the storage device 103 as needed.

The storage device 103 has a function as a storage medium for storing various kinds of information. A configuration of the storage device 103 is not limited particularly However, it is preferable that the storage device 103 is configured so as to be capable of storing all of the various kinds of information required to control the video game from the viewpoint of reducing a processing load on each of the plurality of user terminals 20 and 201 to 20N. As such examples, there are an HDD and an SSD. However, a storage unit for storing the various kinds of information may be provided with a storage region in a state that the server 10 can access the storage region, for example, and may be configured so as to have a dedicated storage region outside the server 10.

Figure 2:
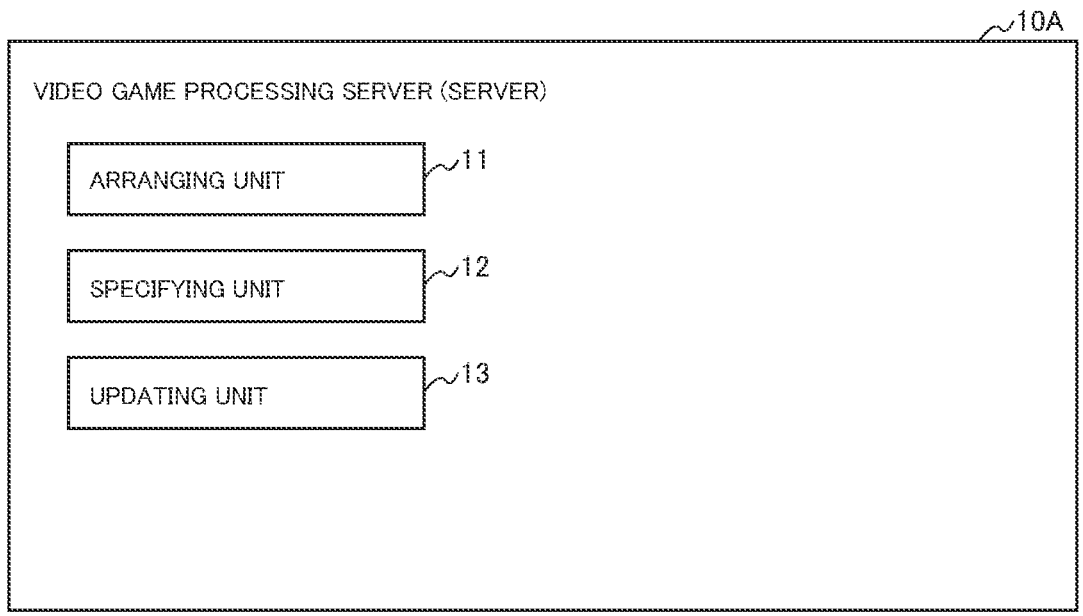
FIG. 2 is a block diagram illustrating a configuration of a server corresponding to at least one of the embodiments of the present disclosure.

FIG. 2 is a block diagram illustrating a configuration of a video game processing server 10A (hereinafter, referred to as a "server 10A"), which is an example of the configuration of the server 10. As illustrated in FIG. 2, the server 10A at least includes an arranging unit 11, a specifying unit 12, and an updating unit 13.

The arranging unit 11 has a function to arrange objects in a virtual space corresponding to map information of a real space. At least one attribute of a plurality of attributes is associated with each of the objects.

Here, the attribute associated with the object means a property or a characteristic of an object. A relationship between the object and the attribute is not limited particularly. However, it is preferable that the relationship is a relationship in which the user can recognize an attribute associated with an object on the basis of appearance of the object. As examples of a configuration to associate an object with an attribute, there are a configuration in which an object and an attribute are associated with each other on the basis of information related to the object by execution of a specific program, and a configuration in which a provider of a video game associates an object with an attribute. Further, the object means a virtual object used in the video game. Further, as examples of the attribute, there are a geographical property or characteristic, and a characteristic about a specific place.

Further, a configuration to associate at least one attribute of a plurality of attributes with an object is not limited particularly. However, it is preferable that the arranging unit 11 is configured so that at least one attribute is associated with the object on the basis of information related to a position of the object in the virtual space. As an example of such a configuration, there is a configuration in which an attribute determined on the basis of information associated with each of positions that become candidates of an arrangement position of an object is associated with the object.

Further, the virtual space corresponding to the map information of the real space means a virtual space that is generated by using the map information of the real space. A configuration to generate the virtual space is not limited particularly. However, it is preferable that the arranging unit 11 is configured so that the user can recognize that the virtual space is generated on the basis of the map information of the real space. As an example of such a configuration, there is a configuration in which the virtual space is generated by respectively arranging objects corresponding to roads and buildings in the real space at positions corresponding to roads and buildings in the real space. In this regard, a configuration of the object corresponding to each of the roads and the buildings in the real space is not limited particularly. However, it is preferable that the object is configured so that the user can recognize that it has a correspondence relationship with a road, a building, or the like. As examples of such a configuration, there are an object created to resemble the appearance of a road and an object (for example, a user character) different from objects that constitute the virtual space (for example, the ground). Further, a configuration to associate the position in the real space with the position in the virtual space is not limited particularly. However, the arranging unit 11 may be configured so that a coordinate in the real space and a coordinate in the virtual space are defined in a one-to-one relationship, or may be configured so that the coordinates are defined in a plural-to-one relationship or a one-to-plural relationship.

Further, the phrase "arrange objects in a virtual space" means that each of objects is associated with a position in a virtual space. Here, a configuration to arrange objects is not limited particularly. However, it is preferable that objects are arranged so as to be displayed on a game screen of a user terminal. As an example of such a configuration, there is a configuration in which a predetermined number objects are arranged at random on the basis of a current position of a user. In this regard, the objects may be displayed on a display screen of the user terminal 20 in a case where the arranged positions or an area corresponding to the objects including the arranged positions are/is included in a display area of the user terminal 20.

The specifying unit 12 has a function to specify an object that satisfies a predetermined positional condition with respect to positional information of the user terminal 20.

Here, the positional information of the user terminal 20 means information indicating a position of the user terminal 20 in the real space. A configuration of the positional information is not limited particularly. However, it is preferable that the positional information is configured so as to contain coordinates that can specify the position of the user terminal 20 in the real space. As examples of the configuration to obtain the positional information of the user terminal 20, there are a configuration to obtain the positional information by using a GPS signal, and a configuration to obtain the positional information on the basis of reception intensity information of wireless signals from a plurality of beacon transmitters.

Further, the predetermined positional condition with respect to the positional information of the user terminal 20 means a condition that a position in the virtual space corresponding to the position of the user terminal 20 in the real space and a position in the virtual space at which the object is arranged have a predetermined relationship. As an example of the positional condition, there is a condition that a distance between the position in the virtual space corresponding to the position of the user terminal 20 in the real space and the position in the virtual space at which the object is arranged is a predetermined length or shorter As an example of a condition other than the positional condition, there is a condition that a selection operation for an object is carried out.

The updating unit 13 has a function to update information regarding the user on the basis of an attribute of the specified object.

Here, a configuration of the information regarding the user is not limited particularly. However, it is preferable that it is configured so that such information can be changed whenever a corresponding object is specified. As examples of such a configuration, there are a point to which an attribute associated with an object specified by movement of the user is reflected, and a privilege that is given to the user on the basis of the point. In this regard, it is preferable that the information regarding the user is information to be displayed on a game screen. Further, the information regarding the user may be information that is related to an event that is generated in the virtual space or information that is not related to an event. In this regard, the event means any of various kinds of occurrences that can be generated in the video game. The content of the event is not limited particularly. However, it is preferable that it is the content according to a kind of the object. As examples of the content of the event, there are a battle against an enemy character, recovery of a friend character, and search of a dungeon.

Further, the phrase "update information" means that at least part of target information is changed. A configuration to update information is not limited particularly. Such a configuration may be a configuration in which the content of information stored in a storage unit as information regarding a user is changed, or a configuration in which various kinds of flag information is changed. In this regard, it is preferable that, in a case where the information regarding the user is to be updated, information for which the user can confirm an update result thereof is updated.

Further, a configuration to update information regarding the user on the basis of an attribute of the specified object is not limited particularly. However, it is preferable that the configuration is a configuration in which information is updated so that a user can take advantage of progress of a video game by the update, or a configuration in which information is updated so that a user can recognize an update result thereof. In this regard, the information to be updated may differ depending upon the attribute of the object. Further, even in a case where the same information is to be updated, the update result of the information may differ depending upon the attribute of the object.

Each of the plurality of user terminals 20, and 201 to 20N is managed by the user, and is configured by a communication terminal capable of playing a network delivery type game, such as a cellular telephone terminal, a PDA (Personal Digital Assistants), a portable game apparatus, or a so-called wearable device, for example. In this regard, the configuration of the user terminal that the video game processing system 100 can include is not limited to the example described above. Each of the user terminals 20, and 201 to 20N may be configured so that the user can recognize the content of the video game. As the other examples of the user terminal, there are one obtained by combining various kinds of communication terminals, a personal computer, and a stationary game apparatus.

Further, each of the plurality of user terminals 20, and 201 to 20N is connected to the communication network 30, and includes hardware (for example, a display device for displaying a browser screen or a game screen based on a coordinate and the like) and software for executing various kinds of processes by communicating with the server 10A. In this regard, each of the plurality of user terminals 20, and 201 to 20N may be configured so as to be able to directly communicate with each other without the server 10A.

Next, an operation of the video game processing system 100 (hereinafter, referred to as the "system 100") according to the present embodiment will be described.

Figure 3:
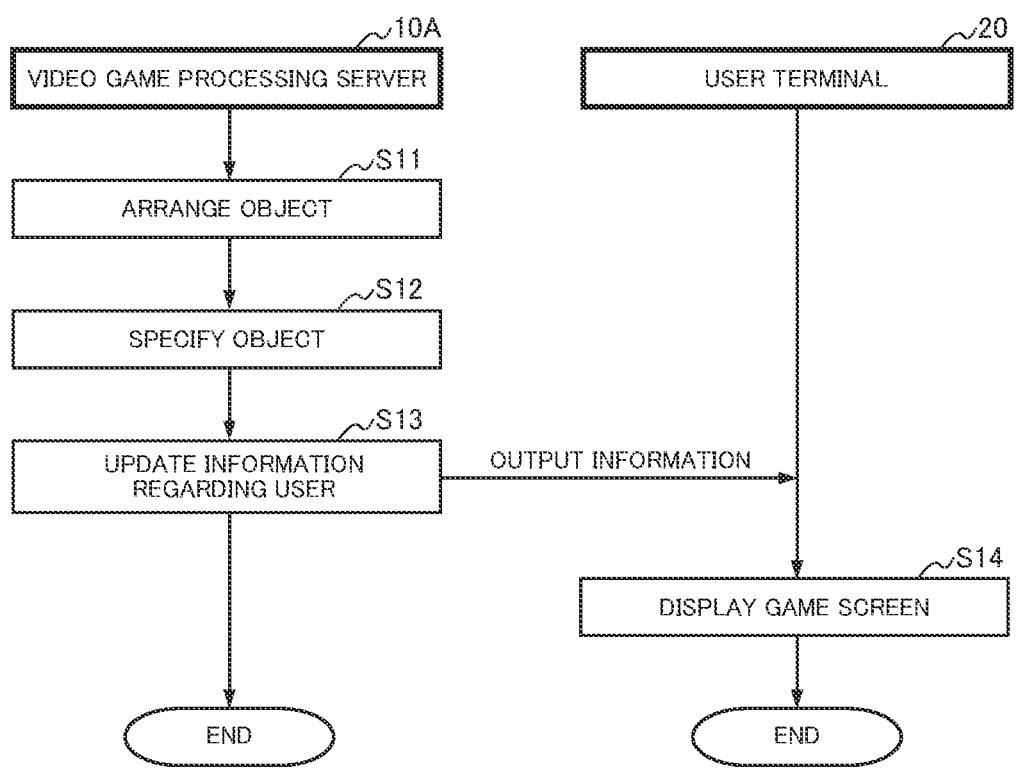
FIG. 3 is a flowchart illustrating an example of game processing corresponding to at least one of the embodiments of the present disclosure.

FIG. 3 is a flowchart illustrating an example of game processing executed by the system 100. In the game processing according to the present embodiment, processes related to a control of progress of the video game in response to an operation of the user of the user terminal 20 (hereinafter, referred to as the "terminal 20") are executed. Hereinafter, a case where the server 10A and the user terminal 20 (hereinafter, referred to as the "terminal 20") execute the game processing will be described as an example.

The game processing is started as an opportunity that the terminal 20 accessing the server 10A requests display of a virtual space, for example.

In the game processing, the server 10A first arranges objects, with each of which at least one attribute of a plurality of attributes is associated, in a virtual space corresponding to map information of a real space (Step S11). In the present embodiment, the server 10A arranges objects with each of which an attribute set in the virtual space, in which the user is positioned, is associated in the virtual space in accordance with predetermined rule.

When the objects are arranged, the server 10A specifies an object that satisfies a predetermined positional condition with respect to positional information of the terminal 20 (Step S12). In the present embodiment, the server 10A specifies an object that exists at a position in which a distance to a position in the virtual space corresponding to a position of the terminal 20 in the real space is a predetermined length or shorter.

When the object is specified, the server 10A updates information regarding the user on the basis of an attribute of the specified object (Step S13). In the present embodiment, the server 10A changes the content of information stored in a storage unit as indicating the information regarding the user. Further, the server 10A transmits, to the terminal 20, output information on update of the information regarding the user.

Figure 4:
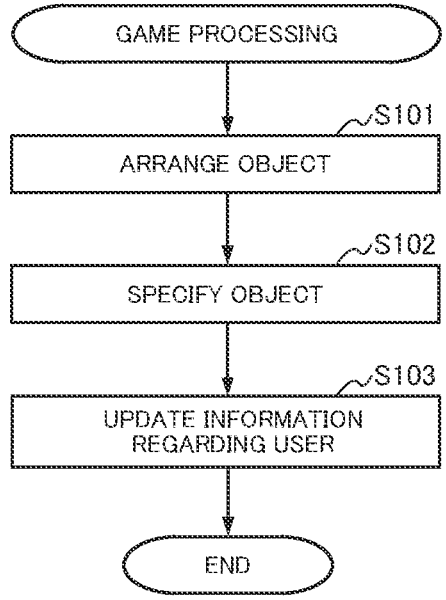
FIG. 4 is a flowchart illustrating an example of an operation of a server side in the game processing corresponding to at least one of the embodiments of the present disclosure.

FIG. 4 is a flowchart illustrating an example of an operation of the server 10A side in the game processing. Here, an operation of the server 10A in the system 100 will be described again.

In the game processing, the server 10A first arranges objects, with each of which at least one attribute of a plurality of attributes is associated, in a virtual space corresponding to map information of a real space (Step S101). Next, the server 10A specifies an object that satisfies a predetermined positional condition with respect to positional information of the terminal 20 (Step S102). Next, the server 10A updates information regarding the user on the basis of an attribute of the specified object (Step S103). When the information regarding the user is updated, the server 10A terminates the processes herein.

Figure 5:
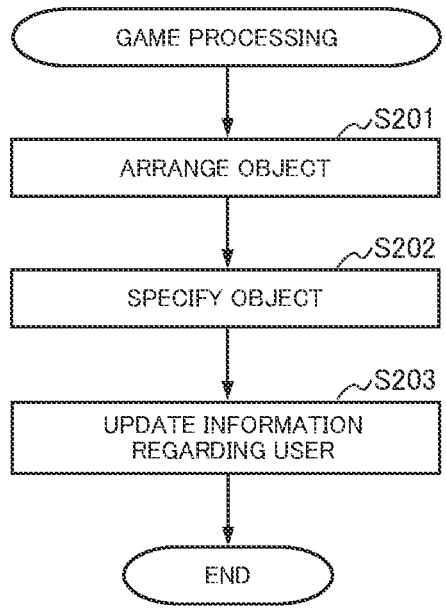
FIG. 5 is a flowchart illustrating an example of an operation of a terminal side in the game processing corresponding to at least one of the embodiments of the present disclosure.

FIG. 5 is a flowchart illustrating an example of the terminal 20 side in a case where the terminal 20 executes the game processing. Hereinafter, a case where the terminal 20 executes the game processing by a single body will be described as an example. In this regard, the configuration of the terminal 20 includes the similar functions to those of the server 10A except that the terminal 20 receives various kinds of information from the server 10A. For this reason, its explanation is omitted from a point of view to avoid repeated explanation.

In the game processing, the terminal 20 first arranges objects, with each of which at least one attribute of a plurality of attributes is associated, in a virtual space corresponding to map information of a real space (Step S201). Next, the terminal 20 specifies an object that satisfies a predetermined positional condition with respect to positional information of the terminal 20 itself (Step S202). Next, the terminal 20 updates information regarding the user on the basis of an attribute of the specified object (Step S203). When the information regarding the user is updated, the terminal 20 terminates the processes herein.

As explained above, as one side of the first embodiment, the server 10A that controls progress of the video game using the virtual space corresponding to the map information of the real space and the positional information of the terminal 20 is configured so as to at least include the arranging unit 11, the specifying unit 12, and the updating unit 13. Thus, the arranging unit 11 arranges the objects, with each of which at least one attribute of the plurality of attributes is associated, in the virtual space corresponding to the map information of the real space; the specifying unit 12 specifies the object that satisfies the predetermined positional condition with respect to the positional information of the terminal 20; and the updating unit 13 updates the information regarding the user on the basis of the attribute of the specified object. Therefore, it becomes possible to maintain interest of the user in the video game.

Namely, in the video game using the virtual space corresponding to the map information of the real space and the positional information of the terminal 20, it becomes possible to encourage the user not only to generate an event, but also to move in the real space for the purpose of updating the information regarding the user. Therefore, it is possible to have variation in the encouragement of moving in the real space for the user, and this makes it possible to maintain interest of the user in the video game. In other words, with respect to the video game, it can be expected that the variety of motivation to move in the real space is improved, and as a result, the user plays the video game more positively.

Second Embodiment

Figure 6:
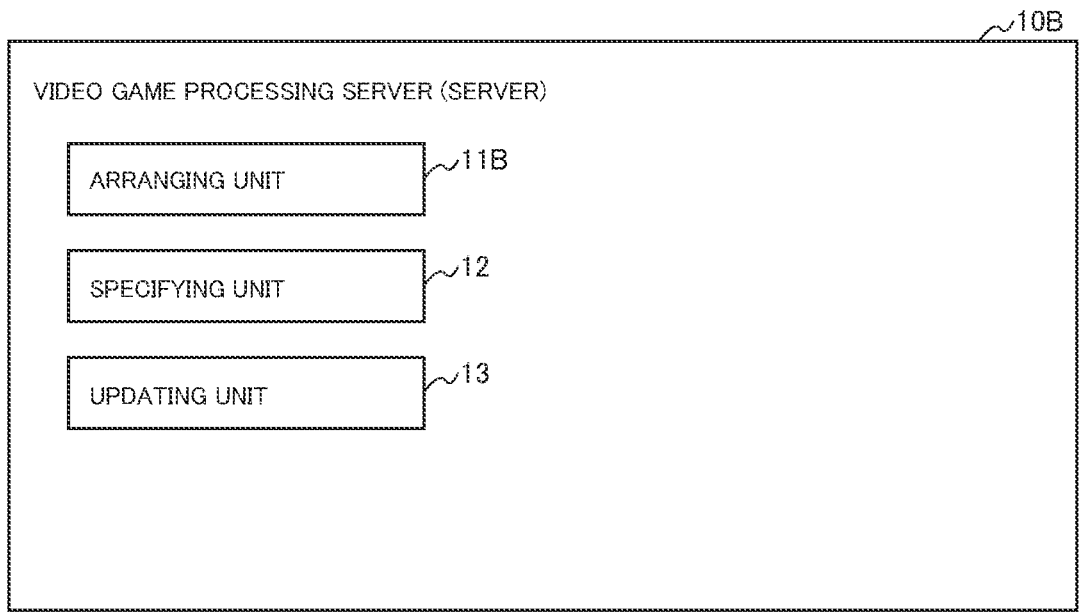
FIG. 6 is a block diagram illustrating a configuration of a server corresponding to at least one of the embodiments of the present disclosure.

FIG. 6 is a block diagram illustrating a configuration of a video game processing server 108 (hereinafter, referred to as a "server 10B"), which is an example of the video game processing server 10. In the present embodiment, the server 10B at least includes an arranging unit 11B, a specifying unit 12, and an updating unit 13.

At least one attribute of a plurality of attributes is associated with an object according to a second embodiment on the basis of information regarding a real space corresponding to an arrangement position of the object.

Here, the arrangement position of the object means a position where an object is scheduled to be arranged in a virtual space or a position where an object is arranged in the virtual space. In this regard, a position where an object is actually arranged may be different from a position where the object is scheduled to be arranged at the time of associating the object with an attribute.

Further, the information regarding the real space is not limited particularly. The information regarding the real space may be information regarding the geography of the real space, or information regarding a specific place that exists in the real space. As examples of the information regarding the real space, there are information indicating a state of land in a real space, and information indicating a name and characteristics of specific facility that exists in a real space.

The arranging unit 11B has a function to arrange objects, with each of which at least one attribute of a plurality of attributes is associated, in the virtual space corresponding to map information of the real space on the basis of the information regarding the real space corresponding to the arrangement position.

Figure 7:
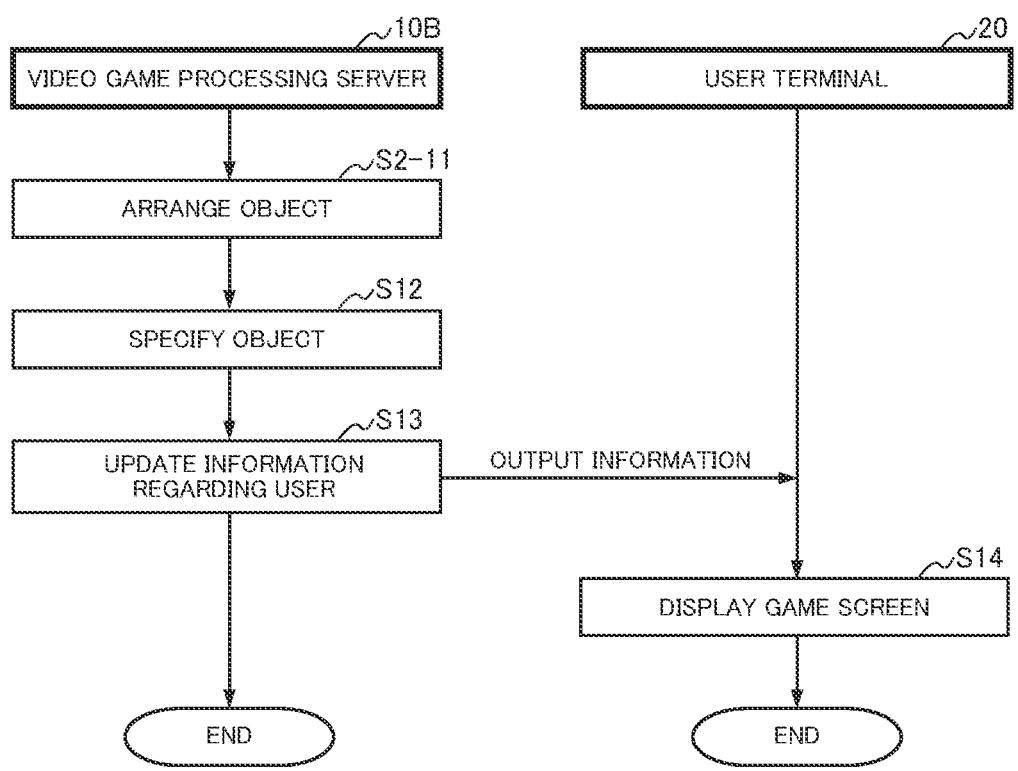
FIG. 7 is a flowchart illustrating an example of game processing corresponding to at least one of the embodiments of the present disclosure.

FIG. 7 is a flowchart illustrating an example of game processing executed by a video game processing system 100. Hereinafter, operations of the server 10B and a user terminal 20 (hereinafter, referred to as a "terminal 20") will be described as an example. In this regard, a flowchart illustrating an operation of each of the server 10B and the terminal 20 is omitted from a point of view to avoid repeated explanation.

In the game processing, the server 10B first arranges objects, with each of which at least one attribute of a plurality of attributes is associated, in a virtual space corresponding to map information of a real space on the basis of information regarding a real space corresponding to an arrangement position (Step S2-11). In the present embodiment, the server 10B arranges objects, with each of which at least one attribute of the plurality of attributes is associated, in the virtual space corresponding to the map information of the real space on the basis of information regarding the geography regarding the real space corresponding to the arrangement position or a name of specific facility that exists in the real space.

As explained above, as one side of the second embodiment, the server 10B that controls progress of the video game using the virtual space corresponding to the map information of the real space and positional information of the terminal 20 is configured so as to at least include the arranging unit 11B, the specifying unit 12, and the updating unit 13. Thus, the arranging unit 11B arranges objects, with each of which at least one attribute of a plurality of attributes is associated, in the virtual space corresponding to map information of the real space on the basis of the information regarding the real space corresponding to the arrangement position. Therefore, it is possible to cause the user to aware that the object in the virtual space is connected to the real space, and as a result, it becomes possible to attract interest of the user in the video game.

Third Embodiment

Figure 8:
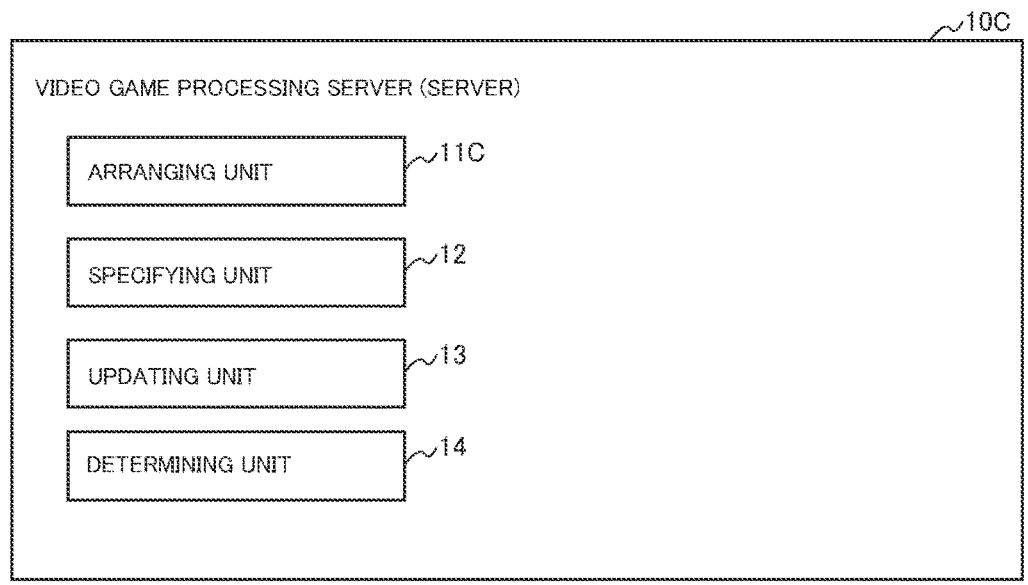
FIG. 8 is a block diagram illustrating a configuration of a server corresponding to at least one of the embodiments of the present disclosure.

FIG. 8 is a block diagram illustrating a configuration of a video game processing server 10C (hereinafter, referred to as a "server 10C"), which is an example of the video game processing server 10. In the present embodiment, the server 10C at least includes an arranging unit 11C, a specifying unit 12, an updating unit 13, and a determining unit 14.

The determining unit 14 has a function to determine a destination on the basis of a user operation.

Here, a configuration to receive the user operation is not limited particularly. However, it is preferable that the determining unit 14 is configured so that a user can grasp a destination in a virtual space and a position in a real space. As an example of such a configuration, there is a configuration in which a game screen representing a virtual space including a position of the user is displayed and a position specified by the user is received as a destination. Here, the position specified by the user means a position that is determined by an intention of the user A configuration to cause the user to specify any position in the virtual space is not limited particularly. Such a configuration may be any of a configuration in which the user is caused to specify an arbitrary position from the whole virtual space, a configuration in which the user is caused to specify an arbitrary position within a predetermined area in the virtual space, and a configuration in which the user is caused to select any one from a plurality of choices. In this regard, the number of positions specified by the user may be one or two or more. Further, what the user is caused to specify may be an area in the virtual space other than the position. In this regard, a configuration to cause the user to specify the position may be a configuration in which positional information of a user terminal 20 when a predetermined operation is inputted from the user is treated as the position specified by the user.

Further, the destination means a specific position in the virtual space, and is a position to which the user is scheduled to move in a video game. The destination is not limited particularly. The destination may be a position that plays a specific role during progress of the video game, or may be a position in the virtual space corresponding to a specific place in the real space. As examples of the destination, there are a position or an area where a specific event is generated in the virtual space, and a position or an area in the virtual space corresponding to a feature on the geography in the real space. In this regard, the feature on the geography in the real space may be a natural object or an artificial object.

Further, the phrase "determine a destination" herein means that information regarding a destination at least containing positional information of the destination is specified. A configuration to specify information regarding the destination is not limited particularly, and may be a configuration in which information indicating a position of a destination in a virtual space, a name of the destination, the content of an event associated with the destination, and the like is specified.

The arranging unit 11C has a function to arrange objects in the virtual space on the basis of a position of the destination determined by the determining unit 14.

Here, a configuration to arrange objects on the basis of the position of the destination is not limited particularly. However it is preferable that the arranging unit 11C is configured so that an object having appearance by which the user can recognize that the object corresponds to a destination is arranged, or so that an object is arranged at a position related to a destination. As examples of such a configuration, there are a configuration in which an object associated with a destination in advance is arranged at a position of the destination, and a configuration in which an object is arranged at a position other than a position of a destination. As examples of the configuration to arrange objects at a position other than a position of a destination, there are a configuration in which an object having appearance, by which the user can recognize that it is a movement path from a position of the user in a virtual space to a position of a destination when a user operation is received, is arranged at any position on the movement path, and a configuration in which an object is arranged in the vicinity of a destination.

Figure 9:
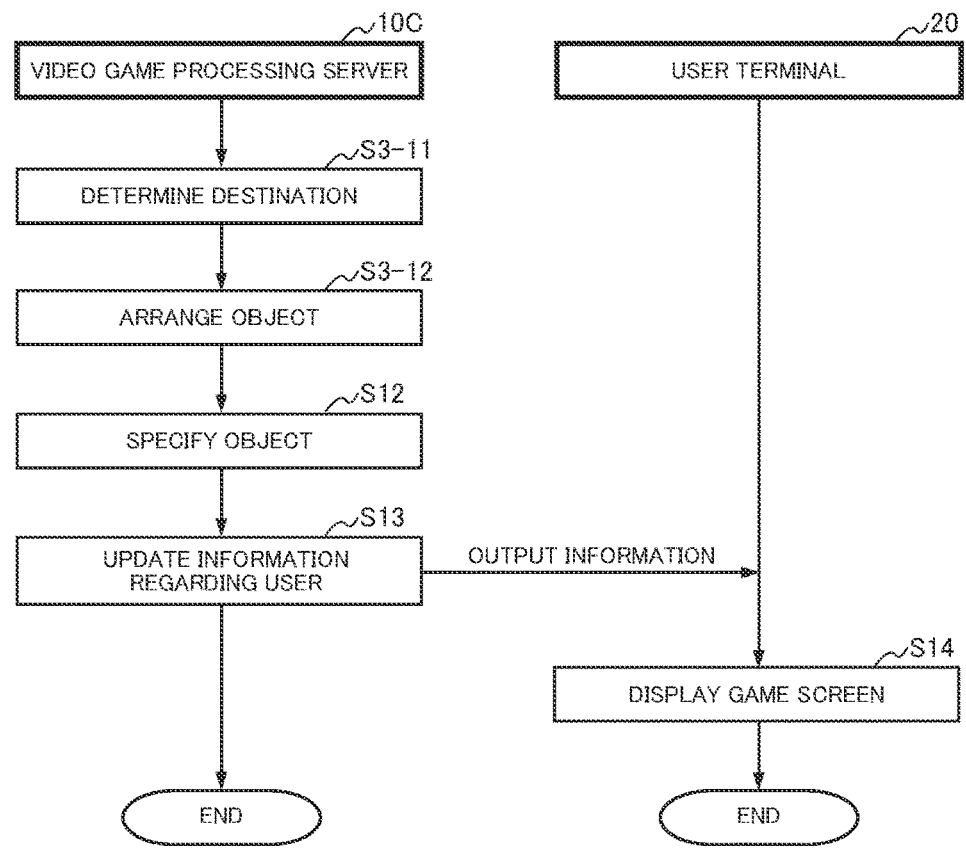
FIG. 9 is a flowchart illustrating an example of game processing corresponding to at least one of the embodiments of the present disclosure.

FIG. 9 is a flowchart illustrating an example of game processing executed by a video game processing system 100. Hereinafter, operations of the server 10C and the user terminal 20 (hereinafter, referred to as the "terminal 20") will be described as an example. In this regard, a flowchart illustrating an operation of each of the server 10C and the terminal 20 is omitted from a point of view to avoid repeated explanation.

In the game processing, the server 10C first determines a destination on the basis of a user operation (Step S3-11). In the present embodiment, the server 10C causes the user to select any of a plurality of choices for a position in a virtual space, thereby determining the selected choice as a destination.

When the destination is determined, the server 10C arranges objects in the virtual space on the basis of a position of the determined destination (Step S3-12). In the present embodiment, the server 10C arranges objects each having appearance associated with the destination in advance at a specified position.

As explained above, as one side of the third embodiment, the server 10C that controls progress of the video game using the virtual space corresponding to the map information of the real space and the positional information of the terminal 20 is configured so as to at least include the arranging unit 11C, the specifying unit 12, the updating unit 13, and the determining unit 14. Thus, the determining unit 14 determines the destination on the basis of the user operation, and the arranging unit 11C arranges the objects in the virtual space on the basis of the position of the determined destination. Therefore, it is possible to set an object for which information regarding the user can be updated by the user himself or herself, and this makes it possible to give the user stronger motivation to move in the real space in the video game.

Fourth Embodiment

Figure 10:
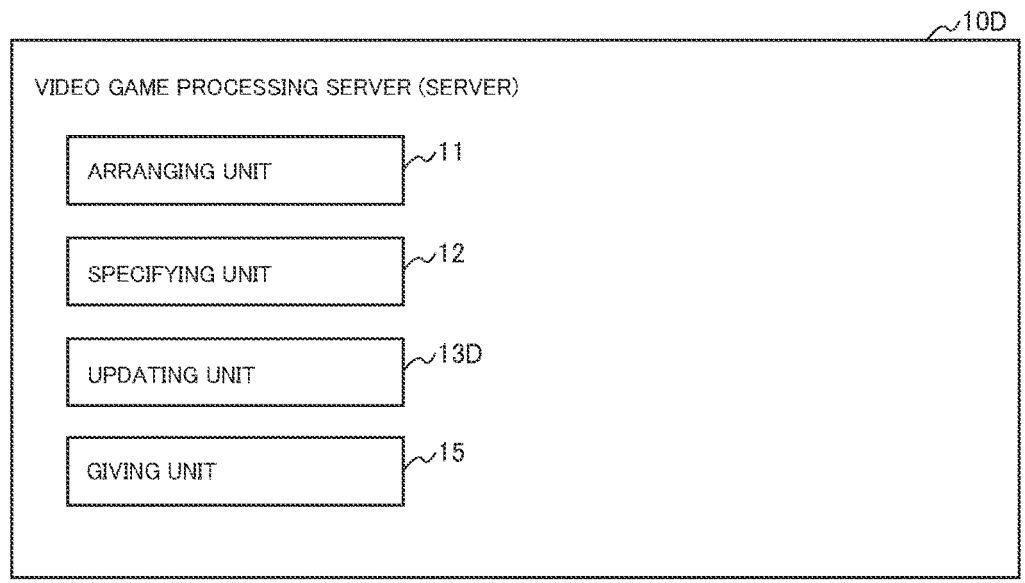
FIG. 10 is a block diagram illustrating a configuration of a server corresponding to at least one of the embodiments of the present disclosure.

FIG. 10 is a block diagram illustrating a configuration of a video game processing server 10D (hereinafter, referred to as a "server 10D"), which is an example of the video game processing server 10. In the present embodiment, the server 10D at least includes an arranging unit 11, a specifying unit 12, an updating unit 13D, and a giving unit 15.

The updating unit 13D has a function to refer to a storage unit for storing character information, in which a character and attribute information are associated with each other, to update the attribute information on the basis of an attribute of an object specified by the specifying unit 12.

Here, the character means an object that appears in a video game. The character may be one that is displayed in a virtual space corresponding to map information of a real space, or may be one that is not displayed. As examples of the character, there are a human character and a so-called monster character other than humans. In this regard, association of a character with a user is not limited particularly. The character and the user may be associated with each other in a one-to-one relationship, or may be associated with each other in a one-to-plural relationship. Further, the character may not be associated with any user.

Further, the attribute information means information on a single attribute or information on a plurality of attributes. The attribute information is not limited particularly so long as the attribute information contains information by which a type of attribute can be identified. However, it is preferable that the attribute information is information containing information indicating an attribute value corresponding to an attribute (hereinafter, referred to as "attribute value information"). In this regard, the information that can identify the attribute may be an identification code of the attribute, or may be character string information indicating a name of the attribute.

Further, a configuration to update the attribute information on the basis of the attribute of the object is not limited particularly. However, it is preferable that the configuration is a configuration in which the attribute value information corresponding to the attribute of the object, which is stored in the storage unit as the attribute information, is updated. As an example of such a configuration, there is a configuration in which attribute value information is updated so that an attribute value corresponding to an attribute similar to an attribute of an object is changed by a predetermined number.

The giving unit 15 has a function to give a privilege to the user in a case where the attribute information satisfies a privilege condition.

Here, the privilege condition is a condition regarding the attribute information, and means a condition for giving a privilege to a user. A configuration of the privilege condition is not limited particularly. However, it is preferable that the privilege condition is configured so as to include a condition regarding the attribute value information. As an example of the configuration of the privilege condition, there is a configuration in which the privilege condition includes a condition that the attribute value is within a predetermined range.

Further, the privilege means a privilege that is given to a user in the video game. A configuration of an element to be the privilege is not limited particularly. The privilege may be an element that the user can use or an element that the user cannot use. However, it is preferable that the privilege is advantageous to progress of the video game. As examples of the privilege, there are an in-game element, a right in the video game (for example, a right of a predetermined character to become a companion of a user), and occurrence of a temporary process in the video game (for example, a change in the character, or occurrence of a so-called buff). In this regard, the change in the character means a change in information regarding the character (for example, growth or transformation of a character).

Figure 11:
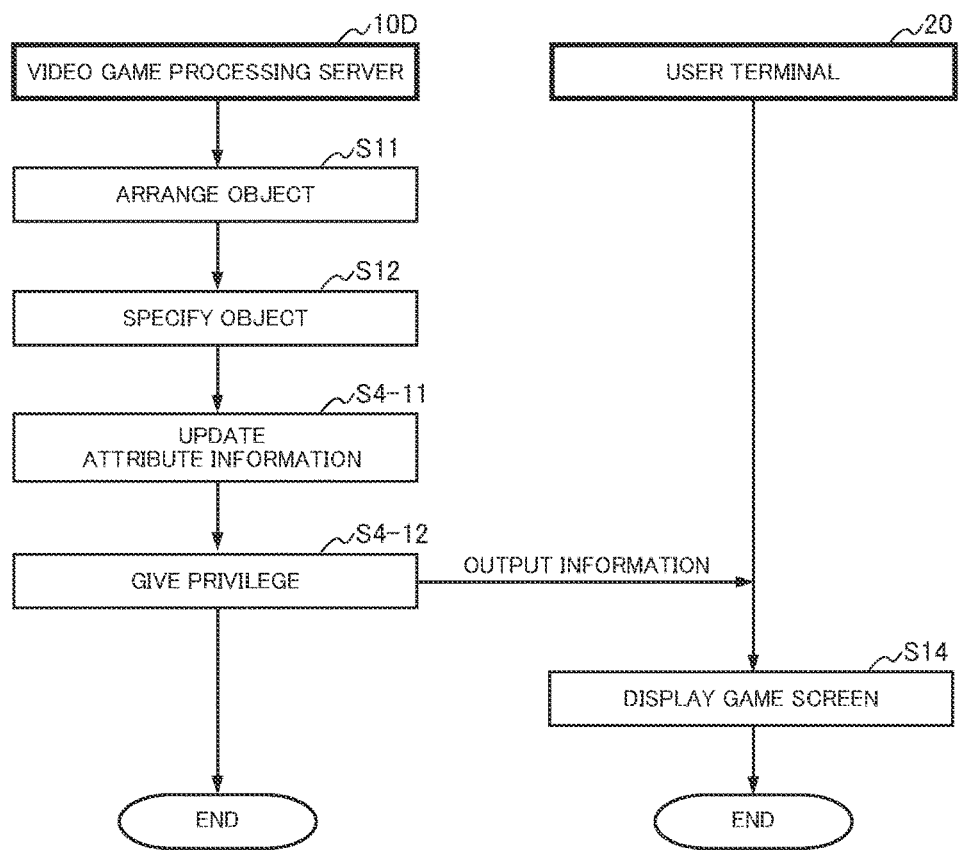
FIG. 11 is a flowchart illustrating an example of game processing corresponding to at least one of the embodiments of the present disclosure.

FIG. 11 is a flowchart illustrating an example of game processing executed by a video game processing system 100. Hereinafter, operations of the server 10D and a user terminal 20 (hereinafter, referred to as a "terminal 20") will be described as an example. In this regard, a flowchart illustrating an operation of each of the server 10D and the terminal 20 is omitted from a point of view to avoid repeated explanation.

When an object is specified, the server 10D refers to a storage unit for storing character information, in which a character and attribute information are associated with each other, to update the attribute information on the basis of an attribute of a specified object (Step S4-11). In the present embodiment, the server 10D updates the attribute information so that an attribute value corresponding to an attribute similar to an attribute of the object is changed by a predetermined number.

When the attribute information is updated, the server 10D gives a privilege to the user in a case where the attribute information satisfies a privilege condition (Step S4-12). In the present embodiment, in a case where a privilege condition that the attribute value corresponding to a predetermined attribute is within a predetermined range is satisfied, the server 10D transforms the character corresponding to the user into a character with a type corresponding to the privilege condition as the privilege to be given to the user.

As explained above, as one side of the fourth embodiment, the server 10D that controls progress of the video game using the virtual space corresponding to the map information of the real space and the positional information of the terminal 20 is configured so as to at least include the arranging unit 11, the specifying unit 12, the updating unit 13D, and the giving unit 15. Thus, the updating unit 13D refers to the storage unit for storing the character information, in which the character and the attribute information are associated with each other, to update the attribute information on the basis of the attribute of the specified object, and the giving unit 15 gives the privilege to the user in a case where the attribute information satisfies the privilege condition. Therefore, it is possible to encourage the user to move in the real space for the purpose of giving of the privilege, and it becomes possible to improve interest of the user in the video game.

Fifth Embodiment

Figures 12, 13:
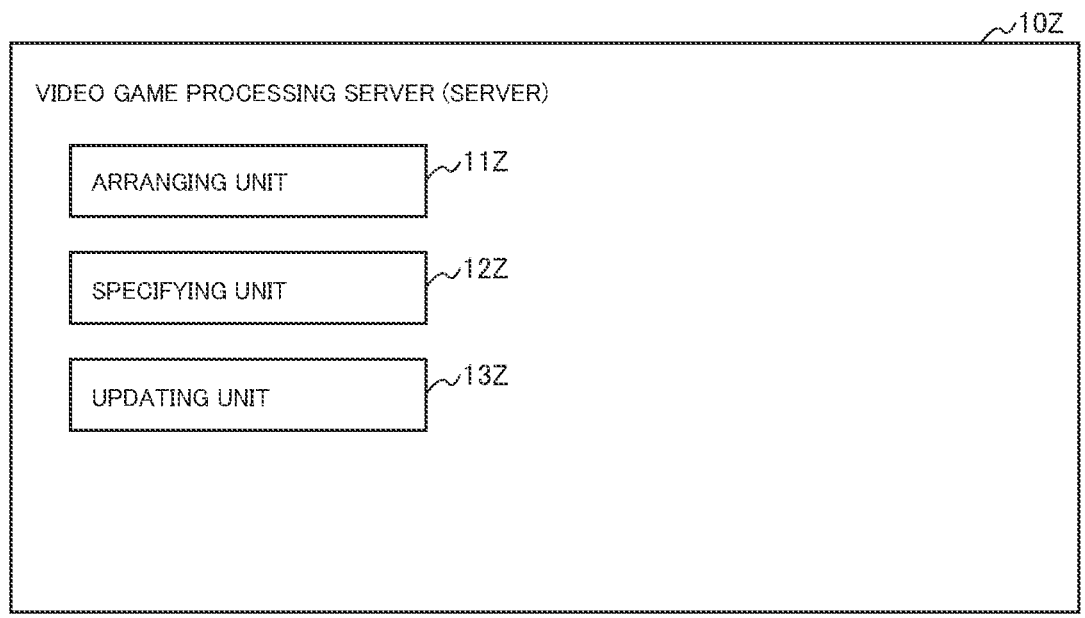
FIG. 12 is a block diagram illustrating a configuration of a server corresponding to at least one of the embodiments of the present disclosure.
FIG. 13 is an explanatory drawing for explaining an example of a storage state of information corresponding to at least one of the embodiments of the present disclosure.

FIG. 12 is a block diagram illustrating a configuration of a video game processing server 10Z (hereinafter, referred to as a "server 10Z"), which is an example of the video game processing server 10 in the video game processing system 100 (see FIG. 1). In the present embodiment, the server 10Z at least includes an arranging unit 11Z, a specifying unit 12Z, and an updating unit 13Z.

The arranging unit 11Z has a function to arrange objects in a virtual space corresponding to map information of a real space. At least one attribute of a plurality of attributes is associated with each of the objects.

Here, the virtual space corresponding to the map information of the real space means a virtual space that is generated by using the map information of the real space. Hereinafter, a configuration in which the virtual space is generated by respectively arranging objects corresponding to roads and buildings in the real space at positions corresponding to the real space will be described as an example.

Here, the object means a virtual object used in the video game. Further,. the attribute associated with the object means a property or a characteristic of the object. Hereinafter, a case where icons representing a recovery spot where a user character (hereinafter, referred to as an "avatar character"), which becomes a character of the user or an operation target of the user in the virtual space, is to be recovered and a destination set by the user are arranged as objects with each of which an attribute is associated will be described as an example.

Further, the attribute associated with the object means a property or a characteristic of an object. At least one attribute of a plurality of attributes is associated with the object on the basis of information regarding the real space corresponding to an arrangement position of the object. In the present embodiment, an object is associated with an attribute determined on the basis of information regarding a position in the real space corresponding to a position of the object in the virtual space (hereinafter, referred to as a "reality corresponding position") and the vicinity of the position.

For example, at least one attribute of a plurality of attributes is associated with the object on the basis of map information of the real space corresponding to the arranged position or POI (Point of Interest) information.

Here, a configuration to associate an attribute with an object on the basis of map information of the real space is not limited particularly. However, it is preferable that the arranging unit 11Z is configured so as to use information regarding the geography containing map information. In the present embodiment, in a case where the map information is used, any attribute from attributes "flat land", "waterside", "nature", and "road" is associated with a spot. In this regard, the information regarding the geography may contain information regarding facility in the real space. Further, in a case where the map information contains information regarding a position of a restaurant, the attribute "food" may be associated with the spot on the basis of the information.

Further, the POI information means information indicating a specific place on a map in the real space. The specific place herein is a point that is specified by a setter in accordance with the purpose. For example, a tourist site, a station, or a restaurant can be specified as the specific place. In the present embodiment, in a case where a landmark exists at a reality corresponding position of a spot, an attribute "landmark property" is associated with the spot. In a case where a restaurant exists at a reality corresponding position of a spot, an attribute "food" is associated with the spot.

Further, the phrase "arrange an object in a virtual space" means that an object and a position thereof in a virtual space are associated with each other. In the present embodiment, in a case where an area corresponding to a spot, with which the spot and a position thereof in the virtual space are associated, is included in a display area of a user terminal 20, the spot is displayed in the display screen of the terminal 20 (hereinafter, referred to as a "terminal 20"). The display area of the terminal 20 herein is an area around a position in the virtual space (that is, a position of the avatar character) corresponding to a position of the terminal 20 in the real space.

The specifying unit 12Z has a function to specify an object that satisfies a predetermined positional condition with respect to positional information of the terminal 20.

Here, the positional information of the terminal 20 means information indicating a position of the terminal 20 in the real space. Hereinafter, a configuration in which positional information using GPS signals is the positional information of the terminal 20 will be described as an example.

Further, the predetermined positional condition with respect to positional information of the terminal 20 means a condition including that a position in the virtual space corresponding to the position of the terminal 20 in the real space and a position in the virtual space at which the object is arranged have a predetermined relationship. Hereinafter, a case where a configuration of the predetermined positional condition is only a condition that a distance between the avatar character of the user and the spot is a predetermined length or shorter will be described as an example.

The updating unit 13Z has a function to update information regarding the user on the basis of an attribute of the specified object.

Here, the information regarding the user is not limited particularly. However, it is preferable that the information regarding the user is information to be displayed on a game screen. Hereinafter, a case where the information regarding the user is attribute information that is associated with a pet character possessed by the user will be described as an example. Here, the attribute information contains information indicating a value corresponding to an attribute of the object (that is, attribute value information). In the present embodiment, the updating unit 13Z refers to a storage unit for storing character information, in which the pet character and the attribute information are associated with each other, to update the attribute value information on the basis of an attribute of the spot specified by the specifying unit 12Z. Here, the phrase "update the attribute value information" means that an attribute value indicated by the attribute value information (that is, a familiarity degree) is changed into a predetermined number.

Further, the phrase "update information" means that at least part of information to he updated is changed. In the present embodiment, the attribute value information is updated so as to increase the attribute value corresponding to the same attribute as the attribute of the spot.

In this regard, the server 10Z may be configured so as to give a privilege to the user in a case where the updated attribute information satisfies a privilege condition. In the present embodiment, the privilege condition includes a condition regarding the attribute value indicated by the attribute value information. Further, in the present embodiment, the privilege is transformation of the pet character.

Further, the server 10Z may be configured so as to refer to a storage unit for storing history information regarding a history of a privilege or privileges given to the user, and to give the user a privilege different from the privilege or any of the privileges contained in the history information. Here, a configuration of the history information is not limited particularly. However, it is preferable that the server 10Z is configured so that the history information contains information indicating the content of privileges given to the user. In the present embodiment, the history information is information indicating a type of the pet character that a certain user has possessed. Further, the privilege different from the privilege or any of the privileges contained in the history information means privilege(s) that has not been given to the user. In the present embodiment, in a case where a pet character possessed by the user satisfies a privilege condition, the pet character possessed by the user is preferentially transformed into a pet character of a type that the user has no experience of possessing. By configuring the server 10Z in this manner, it becomes possible for the user to easily experience playing the new content of the video game.

Further, the updating unit 13Z has a function to update an attribute of the user or a character corresponding to the user on the basis of an update result of the information regarding the user.

Here, the phrase "update an attribute of the user or a character corresponding to the user" means that the attribute associated with the character is changed. A configuration to update the attribute of the user or the character corresponding to the user is not limited particularly so long as the attribute of the user or the character corresponding to the user is changed as a result of the update. As examples of such a configuration, there are a configuration in which an attribute associated with a character is changed into a type different from that of a current attribute, and a configuration in which a character associated with the user is changed into a character that is different from the currently associated character and has a type different from that of the attribute thereof In the present embodiment, the pet character currently possessed by the user is transformed into one with a different attribute type.

Further, the updating unit 13Z has a function to update the information regarding the user further on the basis of an action history of the user in the video game.

Here, the action history of the user means those that the user has carried out in the video game. A configuration of the action history of the user is not limited particularly. However, it is preferable that the action history is a history of actions that the user himself or herself can grasp. As examples of the action history of the user, there are the number of times of clear of a specific quest (for example, a mega monster subjugation guest) that the user has cleared in the video game, the number of times of normal battles against an enemy character, and a level of the user in the video game (that is, the total experience value obtained by the user).

Further, a configuration to update the information regarding the user further on the basis of the action history of the user is not limited particularly. However, it is preferable that the updating unit 13Z is configured so that the user has an update result that progress of the video game becomes advantageous to the user as a history of a predetermined action by the user increases. In the present embodiment, a transformation condition, which includes a condition that the number of times of clear of the specific quest that the user has cleared in the video game is a predetermined number of times or more, is defined for a specific type of pet character. In this regard, the updating unit 13Z may be configured so that a degree of difficulty of satisfaction of the transformation condition for the pet character is lowered in a case where the user is at a predetermined level or higher in the video game.

Further, the updating unit 13Z has a function to update the information regarding the user further on the basis of step number information. The step number information indicates the number of steps of the user in the real space, which is calculated by the terminal 20.

Here, the step number information indicating the number of steps of the user in the real space may be calculated by a function peculiar to the terminal 20. Further, a configuration to update the information regarding the user further on the basis of the step number information is not limited particularly. However, it is preferable that the updating unit 13Z is configured so as to have a predetermined update result in a case where the number of steps indicated by the step number information is a predetermined first number or more or the number of steps is a predetermined second number or lower. In the present embodiment, a transformation condition, which includes a condition that the number of steps indicated by the step number information is a predetermined first number or more or a condition that the number of steps is a predetermined second number or lower, is defined for the specific type of pet character.

FIG. 13 is an explanatory drawing for explaining an example of a storage state of information stored in a storage unit (not illustrated in the drawings) included in the server 10Z. As illustrated in FIG. 13, at least an object ID, a type, an arrangement position, and an attribute are stored in the storage unit so as to be associated with each other as object related information that is information related to the objects.

Here, the object ID means information for identifying an object.

Further, the type herein means a group of objects that are classified in accordance with a predetermined standard. As the objects in the present embodiment, there are at least three types of objects including "recovery" corresponding to a recovery spot in the virtual space, a "destination" where a quest event is generated, and a "landmark" indicating a landmark in the real space.

Further, the arrangement position means a position at which the object is arranged or a position where the object is scheduled to be arranged. In the present embodiment, the arrangement position is specified by a two-dimensional coordinate in the virtual space.

Further, the attribute herein means a property or a characteristic of the object. In the present embodiment, information stored as an attribute of a spot is information that indicates the geography of the real space corresponding to the arrangement position of the spot in the virtual space or a role in the real space. In the present embodiment, the information indicating the geography of the real space is a "flat land" or a "waterside", for example. Further, in the present embodiment, the information indicating the role in the real space is a "landmark property" indicating that a landmark exists, "food" indicating that a restaurant exists, "travel" indicating that a hotel or the like exists, or "traffic" indicating that a road or the like exists, for example, FIG. 14 is an explanatory drawing for explaining an example of a storage state of information stored in the storage unit (not illustrated in the drawings) included in the server 10Z. As illustrated in FIG. 14, at least a user ID, a character, and history information are stored in the storage unit so as to be associated with each other as user related information that is information regarding the users.

Here, the user ID means information for identifying the user.

Further, the character herein means information regarding a character corresponding to the user. In the present embodiment, as the information regarding the character, at least a character ID, a type ID, attribute information, and a level are associated with each other Here, the character ID means information for identifying the character corresponding to the user.

Further, the type ID means information for identifying a type of character.

Further, the attribute information means information on one attribute or two or more attributes associated with the character. In the present embodiment, attribute value information corresponding to each attribute is indicated by a positive numeral value.

Further, the level herein means a level of the user in the video game. In the present embodiment, the level of the user is indicated by a numeral value as the level herein.

Further, the history information means information regarding a history of privileges that have been given to the user. In the present embodiment, the history information is information that indicates types of pet characters that the user has experienced to possess.

FIG. 15 is an explanatory drawing for explaining an example of a storage state of information stored in the storage unit (not illustrated in the drawings) included in the server 10Z. As illustrated in FIG. 15, at least a character type ID, a type name, and a transformation condition are stored in the storage unit so as to be associated with each other as character type related information that is information related to types of characters.

Here, the character type ID means information for identifying a type of a character Further, the type name means a name of the type of the character In the present embodiment, the type name means a name of a type of a pet character Further, the transformation condition corresponds to a privilege condition, and in the present embodiment, the transformation condition means a condition for transforming a pet character possessed by the user into a pet character of the type indicated by the type name. In the present embodiment, as information indicating conditions that constitute the transformation condition, a current type, a level, an attribute, and the other are associated with each other In the present embodiment, it is determined that the transformation condition is satisfied by satisfying all conditions that constitute the transformation condition.

Here, the current type means a condition of the type of the pet character currently possessed by the user. Information indicating the type of the pet character stored as the current type is information that indicates any of the types of the pet characters stored in the storage unit as the type name.

Further, the level means a lower limit condition of a level of the pet character currently possessed by the user.

Further, the attribute herein means a condition of attribute value information indicated by attribute information associated with the pet character currently possessed by the user. In the present embodiment, a condition of the attribute value information is a lower limit condition of an attribute value corresponding to an attribute of a predetermined type. For example, "flat land 3, waterside 1, nature 1" means that an attribute value of a flat land attribute associated with the pet character of three or more, an attribute value of a waterside attribute associated with the pet character of one or more, and an attribute value of a nature attribute of one or more become conditions. Further, "landmark property 4" means that an attribute value of a landmark property attribute associated with the pet character of four or more becomes a condition.

Further, the other means a condition or conditions different from the current type, the level, and the attribute among the conditions regarding the pet character currently possessed by the user. In the present embodiment, as a condition of the other, there are a condition of experience of possessing a pet character, a condition of the number of steps in the real space, and a condition of a rate of traversing landmarks as spots in the virtual space.

In this regard, in the present embodiment, a type "baby" is a pet character that the user can first possess. For that reason, all conditions that constitute a transformation condition thereof become "none". Further, in the present embodiment, in the video game, the pet character is reset (or reincarnated) at predetermined intervals, and the user starts breeding again from a pet character with a type "baby".

Next, an operation of a video game processing system 100Z (hereinafter, referred to as a "system 100Z"; not illustrated in the drawings), which is an example of the video game processing system 100 (see FIG. 1), will be described. The system 100Z includes the server 10Z. Hereinafter, in order to simplify explanation thereof, a case where the system 100Z executes processes executed by any of the server 10Z and the terminal 20 will be described.

Figure 16:
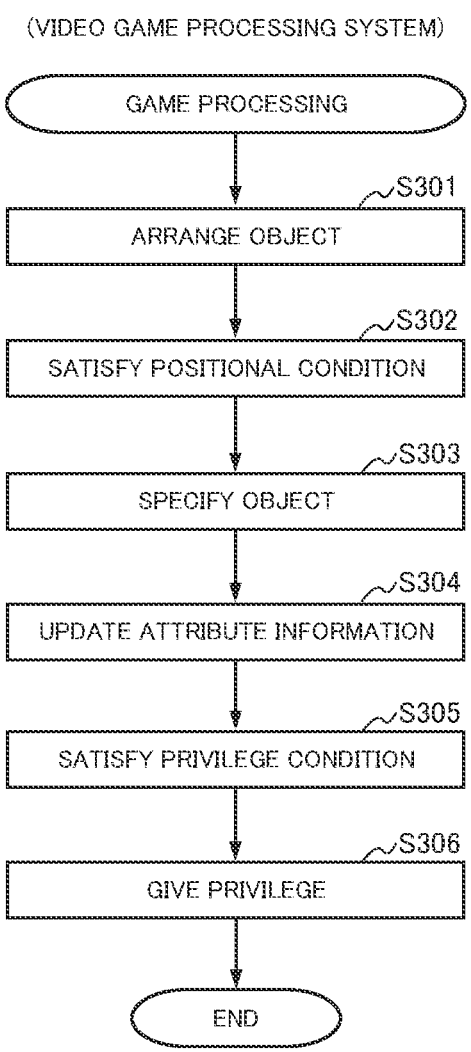
FIG. 16 is a flowchart illustrating an example of game processing corresponding to at least one of the embodiments of the present disclosure.

FIG. 16 is a flowchart illustrating an example of game processing executed by the system 100Z. In the game processing according to the present embodiment, processes related to a control of progress of a video game using the positional information of the terminal 20 in response to an operation of the user are executed. Hereinafter, each of the processes will be described. In this regard, the order of the processes may be changed without any contradiction or the like of processing content, The game processing is started as an opportunity that the terminal 20 accessing the server 10Z requests display of a game screen, for example.

In the game processing, the system 100Z first arranges objects, with each of which at least one attribute of a plurality of attributes is associated, in a virtual space corresponding to map information of a real space (Step S301). In the present embodiment, the system 100Z determines the at least one attribute on the basis of information related to a position of a corresponding spot in the virtual space.

When the objects are arranged, the system 100Z determines whether a positional condition of each object with respect to positional information of the terminal 20 is satisfied or not (Step S302). In the present embodiment, the system 100Z determines whether a condition that a distance between a position in the virtual space corresponding to positional information of the terminal 20 obtained by using GPS signals and a position in the virtual space where the corresponding spot is arranged is a predetermined length or shorter is satisfied or not.

When the satisfaction of the positional condition is determined, the system 100Z specifies an object that satisfies the predetermined positional condition with respect to the positional information of the terminal 20 (Step S303). In the present embodiment, the system 100Z specifies a spot whose distance to an avatar character is a predetermined length or shorter.

When the object is specified, the system 100Z refers to a storage unit for storing character information in which a character and attribute information are associated with each other, and updates the attribute information on the basis of an attribute of the specified object (Step S304). In the present embodiment, the system 100Z updates attribute value information corresponding to a similar attribute to an attribute of the spot among information constituting attribute information associated with a pet character.

When the attribute information is updated, the system 100Z determines whether the attribute information satisfies a privilege condition or not (Step S305). In the present embodiment, the system 100Z determines whether a condition that an attribute value corresponding to a predetermined attribute is within a predetermined range or not is satisfied or not.

When the satisfaction of the privilege condition is determined, the system 100Z gives a privilege to the user (Step S306). In the present embodiment, the system 100Z transforms a pet character currently possessed by the user into a pet character of a type that satisfies a transformation condition, In the present embodiment, when the privilege is given, the system 100Z terminates the processes herein.

Figure 17:
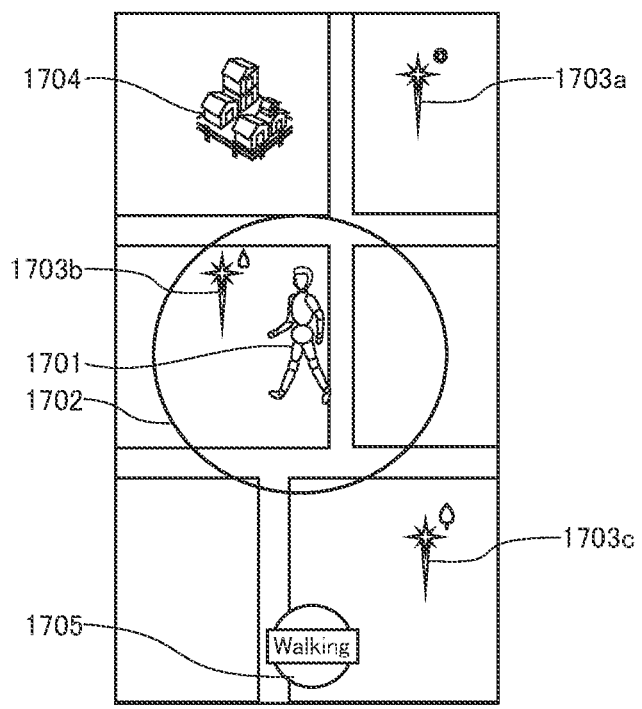
FIG. 17 is an explanatory drawing illustrating an example of a display screen corresponding to at least one of the embodiments of the present disclosure.

FIG. 17 is an explanatory drawing for explaining an example of a game screen. The game screen illustrated in FIG. 17 is a display screen of a virtual space. An avatar character 1701 of a user, an event generable area 1702 based on a position of the avatar character 1701, recovery spots 1703a, 1703b, and 1703c, a destination object 1704, and a pet character screen display button 1705 are illustrated on the game screen of FIG. 17.

The avatar character 1701 is an image indicating an avatar character of the user. The avatar character 1701 is illustrated at a place near the center of the display screen, and is displayed at a position in the virtual space corresponding to positional information of the terminal 20. When a position of the terminal 20 changes in a real space, the avatar character 1701 similarly moves in the virtual space. Further, the event generable area 1702 also moves in accordance with the movement of the avatar character 1701.

The event generable area 1702 means an area where a condition included in conditions for generating an event corresponding to an object is satisfied. In this regard, an area where a positional condition used in a specifying process by the specifying unit 12Z is satisfied may be an area having the same range as that of the event generable area 1702, or may be an area having a different range therefrom.

The recovery spots 1703a to 1703c are spots that are arranged in accordance with a predetermined rule. An image indicating an attribute associated with the corresponding recovery spot is provided at an upper right portion of each of the recovery spots 1703a to 1703c. Since the avatar character 1701 is located in the vicinity of the recovery spot 1703b, an attribute value of an attribute "waterside" in attribute information of a pet character is changed on the basis of an attribute "waterside" of the recovery spot 1703b. In a case where any of the recovery spots 1703a and 1703c is located in the vicinity of the avatar character 1701, an attribute value of each of an attribute "flat land" and an attribute "nature" are changed in the similar manner to the recovery spot 1703b. In this regard, the recovery spot 1703b is positioned in the event generable area 1702. Here, when the user carries out an input operation against the recovery spot 1703b, a recovery event by the recovery spot 1703b is generated. The same applies to each of the recovery spots 1703a and 1703c in a case where the corresponding one is located in the event generable area 1702. In this regard, the recovery spots 1703a to 1703c illustrated in FIG. 17 are examples of objects with each of which an attribute is associated.

The destination object 1704 is an object in which a quest event is generated. Since the avatar character 1701 is located in the vicinity of the recovery spot 1703b, an attribute value of an attribute in the attribute information of the pet character is changed on the basis of the attribute of the recovery spot 1703b. In the example illustrated in FIG. 17, information indicating an attribute associated with the destination object 1704 is not displayed, but the information may be displayed on the display screen. Further, in a case where the destination object 1704 is located in the event generable area 1702 and an input operation against the destination object 1704 is carried out by the user, a quest event by the destination object 1704 is generated. The destination object 1704 illustrated in FIG. 17 is one example of an object with which an attribute is associated. In this regard, with respect to a landmark (not illustrated in the drawings), information indicating an attribute thereof is not displayed as well as the destination object 1704. In the present embodiment, an attribute "landmark property" is associated with the landmark.

The pet character screen display button 1705 is a button for causing the game screen to transition to a game screen on which information regarding the pet character of the user is displayed. When the user carries out a touch operation against the button, the game screen is caused to transition from a game screen on which the virtual space is displayed into a game screen on which information regarding the pet character is displayed.

Figure 18:
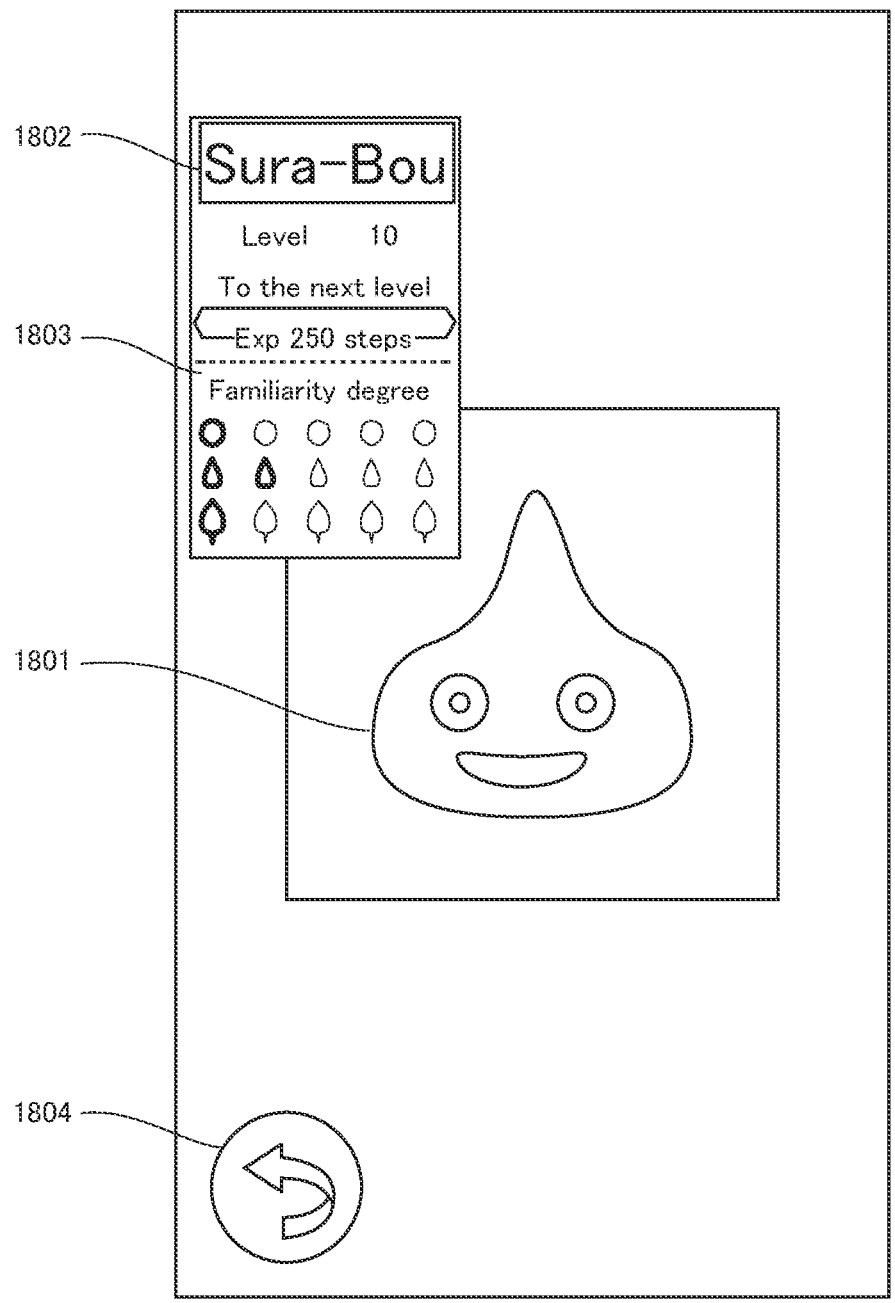
FIG. 18 is an explanatory drawing illustrating another example of the display screen corresponding to at least one of the embodiments of the present disclosure.

FIG. 18 is an explanatory drawing for explaining an example of the game screen. The game screen illustrated in FIG. 18 is a display screen for the information regarding the pet character of the user. A current pet character 1801, a current pet character name 1802, pet character information 1803, and a back button 1804 are illustrated on the game screen of FIG. 18.

The current pet character 1801 is an image of a pet character (corresponding to the user) currently possessed by the user. The current pet character name 1802 is a nickname for the current pet character 1801.

The pet character information 1803 is information regarding the current pet character 1801. In the present embodiment, level information of the current pet character 1801 and familiarity degree information (as one example of attribute information) are illustrated as the pet character information 1803.

The back button 1804 is a button for returning to the game screen on which the virtual space illustrated in FIG. 17 is displayed.

Figure 19:
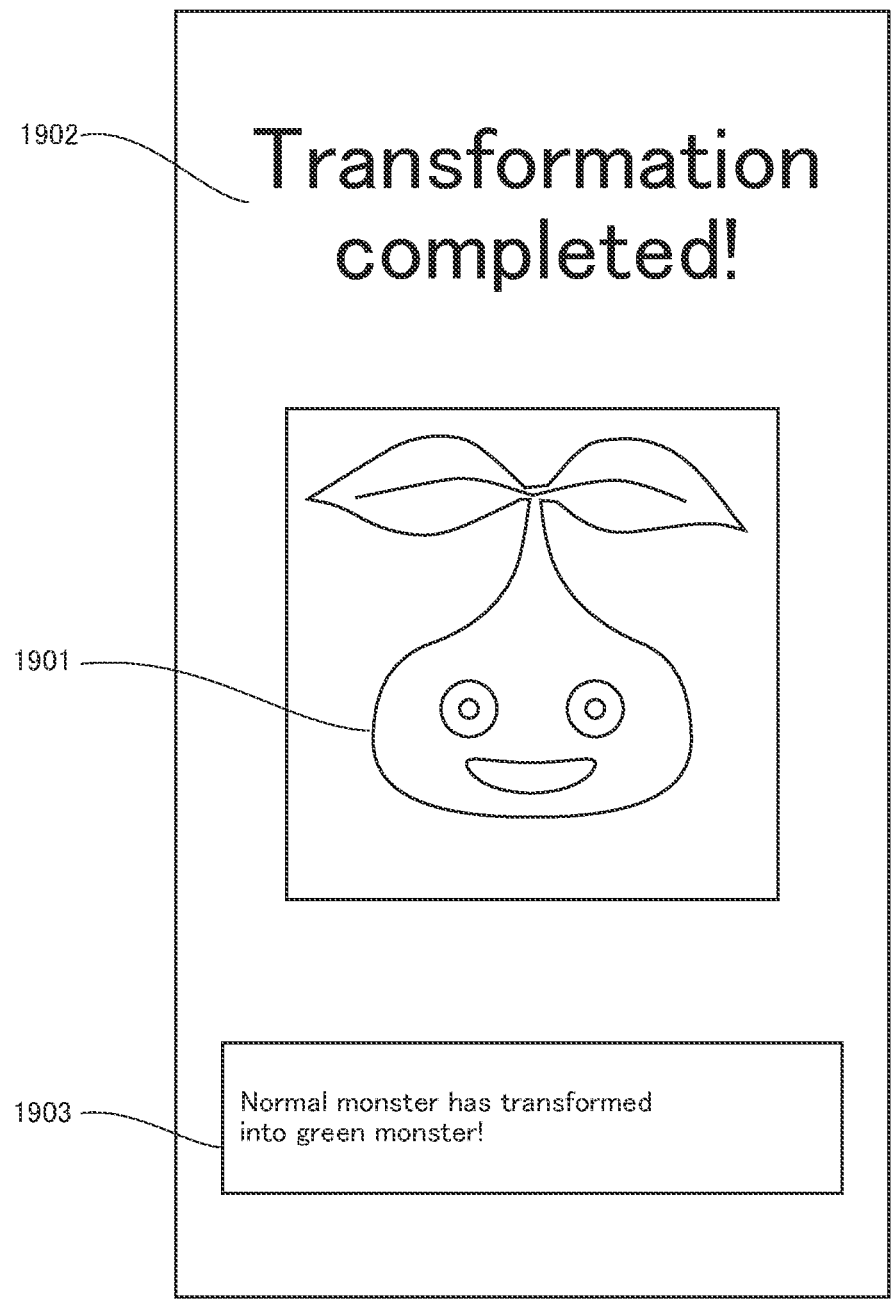
FIG. 19 is an explanatory drawing illustrating still another example of the display screen corresponding to at least one of the embodiments of the present disclosure.

FIG. 19 is an explanatory drawing for explaining an example of a game screen. The game screen illustrated in FIG. 19 is a screen for notifying that a pet character is transformed. An after-transformation pet character 1901, a transformation completion notifying image 1902, and a message display area 1903 are displayed on the game screen of FIG. 19.

The after-transformation pet character 1901 is a pet character into which the current pet character 1801 illustrated in FIG. 18 is transformed. The pet character of the user is transformed from a "normal monster" before transformation into a "green monster". In this regard, the transformation herein corresponds to a privilege given to the user The transformation completion notifying image 1902 is an image by which the user is notified that the transformation of the pet character is completed.

The message display area 1903 is an area for displaying a message by which the content of the transformation of the pet character is notified.

As explained above, as one side of the fifth embodiment, the server 10Z that controls progress of the video game using the virtual space corresponding to the map information of the real space and the positional information of the terminal 20 is configured so as to at least include the arranging unit 11Z, the specifying unit 12Z, and the updating unit 13Z. Thus, the arranging unit 11Z arranges the objects, with each of which at least one attribute of the plurality of attributes is associated, in the virtual space corresponding to the map information of the real space; the specifying unit 12Z specifies the object (for example, the spot) that satisfies the predetermined positional condition with respect to the positional information of the terminal 20; and the updating unit 13Z updates the information regarding the user (for example, the attribute information of the pet character) on the basis of the attribute of the specified object. Therefore, it becomes possible to maintain interest of the user in the video game.

For example, in the video game using the virtual space corresponding to the map information of the real space and the positional information of the terminal 20, how the pet character will be transformed is determined depending upon places and the like where the user often moves, and this makes it possible to cause the user to aware the connection of the video game and the real space more strongly. Further, it is possible to encourage the user to move to various places in the real space due to motivation to cause the pet character to be transformed, and this makes it possible to maintain interest of the user in the video game.

Further, in the example of the fifth embodiment described above, at least one attribute of the plurality of attributes is associated with the object on the basis of the information regarding the real space corresponding to the arrangement position of the object. Therefore, it is possible to cause the user to aware that the object in the virtual space and the real space are connected to each other, and as a result, it becomes possible to attract interest of the user in the video game.

Further, in the example of the fifth embodiment described above, the server 10Z is configured so as to determine a destination on the basis of a user operation, and arrange objects in the virtual space on the basis of a position of the determined destination. Therefore, the user himself or herself can set an object capable of updating the information regarding the user, and this makes it possible to give motivation to move in the real space in the video game more strongly.

Further, in the example of the fifth embodiment described above, the server 10Z is configured so as to: refer to the storage unit for storing the character information in which the character and the attribute information are associated with each other; update the attribute information on the basis of the attribute of the specified object; and give the privilege to the user in a case where the attribute information satisfies the privilege condition. Therefore, it is possible to encourage the user to move in the real space for the purpose of giving of the privilege, and this makes it possible to improve interest of the user in the video game.

Further, in the example of the fifth embodiment described above, the server 10Z is configured so as to refer to a storage unit for storing the history information regarding the history of the privileges that have been given to the user to give the user a different privilege from the privileges that have been given to the user in the history information. As a result, it becomes possible to improve interest of the user in the video game.

Further, in the example of the fifth embodiment described above, the server 10Z is configured so as to update the information regarding the user further on the basis of the action history of the user in the video game. Therefore, it is possible to improve the variety of a method of updating the information regarding the user, and as a result, it becomes possible to further maintain interest of the user in the video game.

Further, in the example of the fifth embodiment described above, the server 10Z is configured so as to update the information regarding the user further on the basis of step number information indicating the number of steps of the user in the real space calculated by the terminal 20. Therefore, it becomes possible to encourage the user to move in the real space further in consideration of a walking distance.

Further, in the example of the fifth embodiment described above, at least one attribute of the plurality of attributes is associated with the object on the basis of the map information or the POI information of the real space corresponding to the arranged position. By associating a more suitable attribute with the object, it is possible to cause the user to further aware the connection between the object in the virtual space and the real space, and as a result, it becomes possible to improve interest of the user in the video game.

Further, in the example of the fifth embodiment described above, the server 10Z is configured so as to update the attribute of the user or the character corresponding to the user on the basis of an update result of the information regarding the user Therefore, it is possible to cause the user to play the video game while being conscious of a relationship between the attribute of the object and the attribute of the user or the character corresponding to the user, and as a result, it becomes possible to improve the taste of the video game.

Further, it has not been mentioned particularly in the example of the fifth embodiment described above. However, a corresponding attribute of the object may be selected on the basis of the attribute associated with the user. A configuration to select an attribute on the basis of the attribute associated with the user is not limited particularly. However, it is preferable that the server 10Z is configured so as to select any of attributes associated with the user. By configuring the server 10Z in this manner, an attribute suitable for each user is associated with the object, and as a result, it becomes possible to prevent the taste of the video game from being lowered.

Further, it has not been mentioned particularly in the example of the fifth embodiment described above. However, in a case where a plurality of objects is arranged in the virtual space, the similar attributes may be associated with some objects that satisfy a positional condition with each other. Here, the phrase "some objects that satisfy a positional condition with each other" means that a positional condition corresponding to each of some objects is satisfied. The plurality of similar attributes means a plurality of attributes that have a common point with each other it is preferable that a process of updating the information regarding the user based on the similar attributes by the server 10Z has similar results. As an example of such a configuration, there is a configuration in which an attribute associated with a recovery spot is the same as an attribute associated with a destination arranged in the vicinity of the recovery spot. Namely, in the vicinity of the destination arranged in the virtual space, the recovery spot having the same attribute as the attribute of the destination is provided with a higher rate compared with a case where the destination is not arranged. By configuring the server 10Z in this manner, it becomes possible to encourage the user to play the video game more effectively.

As explained above, one shortage or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20, and 201 to 20N and the server 10 executes the various kinds of processing described above in accordance with various kinds of control programs (for example, a video game processing program) stored in the storage device with which the corresponding terminal or server is provided.

Further, the configuration of the video game processing system 100 is not limited to the configuration that has been explained as an example of each of the embodiments described above. For example, the system 100 may be configured so that the server 10 executes a part or all of the processes that have been explained as the processes executed by the user terminal 20. Alternatively, the system 100 may be configured so that any of the plurality of user terminals 20, and 201 to 20N (for example, the user terminal 20) executes a part or all of the processes that have been explained as the processes executed by the server 10. Further, the system 100 may be configured so that a part or all of the storage unit included in the server 10 is included in any of the plurality of user terminals 20, and 201 to 20N. Namely, the system 100 may be configured so that a part or all of the functions of any one of the user terminal 20 and the server 10 according to the system 100 is included in the other.

Further, the system 100 may be configured so that the program causes a single apparatus to perform a part or all of the functions that have been explained as the example of each of the embodiments described above without including a communication network.

APPENDIX

The explanation of the embodiments described above has been described so that the following embodiments can be at least performed by a person having a normal skill in the art to which the present disclosure belongs.

(1)

A non-transitory computer-readable medium including a video dame processing program for causing a server to perform functions to control progress of a video game using a virtual space corresponding to map information of a real space and positional information of a user terminal of a user, the functions comprising:

an arranging function configured to arrange objects in the virtual space, at least one attribute of a plurality of attributes being associated with each of the objects;

a specifying function configured to specify an object that satisfies a predetermined positional condition with respect to the positional information of the user terminal; and an updating function configured to update information regarding the user on the basis of an attribute of the specified object.

(2)

The non-transitory computer-readable medium according to (1), wherein at least one attribute of the plurality of attributes is associated with each of the objects on the basis of information regarding the real space corresponding to an arrangement position of the corresponding object.

(2-1)

The non-transitory computer-readable medium according to (2), wherein a corresponding attribute is selected for each of the objects on the basis of an attribute associated with the user.

(3)

The non-transitory computer-readable medium according to (1) or (2), the functions further comprising:

a determining function configured to determine a destination on the basis of a user operation, wherein the arranging function includes a function configured to arrange objects in the virtual space on a basis of a position of the destination.

(4)

The non-transitory computer-readable medium according to any one of (1) to (3), wherein the updating function includes a function configured to refer to a storage unit for storing character information, in which a character and attribute information are associated with each other, to update the attribute information on a basis of an attribute of the object specified by the specifying function, and wherein the functions further comprise a giving function configured to give a privilege to the user in a case where the attribute information satisfies a privilege condition.

(4-1)

The non-transitory computer-readable medium according to (4), wherein the giving function includes a function configured to refer to a storage unit for storing history information regarding a history of the given privilege as a given history to give the user a privilege different from the privilege or any of the privileges contained in the history information.

(5)

The non-transitory computer-readable medium according to any one of (1) to (4), wherein the updating function includes a function configured to update the information regarding the user further on a basis of an action history of the user in the video game.

(6)

The non-transitory computer-readable medium according to any one of (1) to (5), wherein the updating function includes a function configured to update the information regarding the user further on a basis of step number information indicating a number of steps of the user in the real space, the number of steps being calculated by the user terminal.

(7)

The non-transitory computer-readable medium according to any one of (1) to (6), wherein at least one attribute of the plurality of attributes is associated with the object on a basis of map information of the real space corresponding to an arranged position or POI information.

(8)

The non-transitory computer-readable medium according to any one of (1) to (7), wherein, in a case where a plurality of objects is arranged in the virtual space, a similar attribute is associated with each of a predetermined number of objects that satisfy a positional condition with each other.

(9)

The non-transitory computer-readable medium according to any one of (1) to (8), wherein the updating function includes a function configured to update an attribute of the user or an attribute of a character of the user on the basis of an update result of the information regarding the user.

(10)

A non-transitory computer-readable medium including a video game processing program for causing a user terminal to perform at least one function of the functions that the video game processing program described in any one of (1) to (9) causes the server to perform, the user terminal being capable of communicating with the server.

(11)

A video game processing system for controlling progress of a video game using a virtual space corresponding to map information of a real space and positional information of a user terminal of a user, the video game processing system comprising a communication network, a server, and the user terminal, the video game processing system further comprising:

an arranger configured to arrange objects in the virtual space, at least one attribute of a plurality of attributes being associated with each of the objects;

a specifier configured to specify an object that satisfies a predetermined positional condition with respect to the positional information of the user terminal; and art updater configured to update information regarding the user on the basis of an attribute of the specified object.

(12)

The video game processing system according to (11), wherein the server includes the arranger, the specifier, and the updater, and wherein the user terminal includes an output controller configured to output a game screen to a display screen of a display device, the game screen indicating a state of the specified object.

(13)

A non-transitory computer-readable medium including a video game processing program for causing a user terminal to perform functions to control progress of a video game using a virtual space corresponding to map information of a real space and positional information of a user terminal of a user, the functions comprising:

an arranging function configured to arrange objects in the virtual space, at least one attribute of a plurality of attributes being associated with each of the objects;

a specifying function configured to specify an object that satisfies a predetermined positional condition with respect to the positional information of the user terminal; and an updating function configured to update information regarding the user on the basis of an attribute of the specified object.

(14)

A video game processing method of controlling progress of a video game using a virtual space corresponding to map information of a real space and positional information of a user terminal of a user, the video game processing method comprising:

an arranging process configured to arrange objects in the virtual space, at least one attribute of a plurality of attributes being associated with each of the objects;

a specifying process configured to specify an object that satisfies a predetermined positional condition with respect to the positional information of the user terminal; and an updating process configured to update information regarding the user on the basis of an attribute of the specified object.

(15)

A video game processing method of controlling progress of a video game by a video game processing system using a virtual space corresponding to map information of a real space and positional information of a user terminal of a use the video game processing system comprising a communication network, a server, and the user terminal, the video game processing method comprising:

an arranging process configured to arrange objects in the virtual space, at least one attribute of a plurality of attributes being associated with each of the objects;

a specifying process configured to specify an object that satisfies a predetermined positional condition with respect to the positional information of the user terminal; and an updating process configured to update information regarding the user on the basis of an attribute of the specified object.

INDUSTRIAL APPLICABILITY

According to one of the embodiments of the present disclosure, it is useful to be capable of maintaining interest of a user in a video game.

What is claimed is:

1. A non-transitory computer-readable medium storing a video game processing program for causing a computer of a server to perform functions to control progress of a video game, the functions comprising:

arranging objects in a virtual space corresponding to map information of a real space, each object of the objects being associated with at least one attribute of a plurality of attributes;

specifying an object that satisfies a predetermined positional condition with respect to positional information of a user terminal of a user; and updating information regarding the user based on the at least one attribute associated with the specified object, wherein updating the information regarding the user comprises:
referring to a storage that is configured to store character information, the character information including a character and attribute information associated with each other; and
updating the attribute information based on an attribute of the object specified, the functions further comprise giving a privilege to the user if the attribute information satisfies a privilege condition, and giving the privilege to the user comprises referring to the storage that is further configured to store history information regarding a history of giving one or more privileges, in order to give the user a privilege different from the one or more privileges in the history information.

2. The non-transitory computer-readable medium according to claim 1, wherein each object of the objects is associated with the at least one attribute of the plurality of attributes based on information regarding the real space corresponding to an arrangement position of the corresponding object.

3. The non-transitory computer-readable medium according to claim 2, wherein the at least one attribute associated with each object of the objects is selected based on an attribute associated with the user.

4. The non-transitory computer-readable medium according to claim 1, the functions further comprising:
determining a destination based on a user operation,
wherein arranging the objects in the virtual space is based on a position of the destination.

5. The non-transitory computer-readable medium according to claim 1, wherein updating the information regarding the user is based on an action history of the user in the video game.

6. The non-transitory computer-readable medium according to claim 1, wherein updating the information regarding the user is further based on step number information indicating a number of steps of the user in the real space, the number of steps being calculated by the user terminal.

7. The non-transitory computer-readable medium according to claim 1, wherein at least one attribute of the plurality of attributes is associated with the object based on map information of the real space corresponding to at least one of an arranged position or point of interest (POI) information.

8. The non-transitory computer-readable medium according to claim 1, wherein a similar attribute is associated with each object of a predetermined number of objects among the objects that satisfy a positional condition with each other.

9. The non-transitory computer-readable medium according to claim 1, wherein updating the information regarding the user comprises updating an attribute of the user or an attribute of a character of the user based on an update result of the information regarding the user.

10. A video game processing system configured to control progress of a video game, the video game processing system comprising a communication network;
a server;
a user terminal of a user; and
a computer configured to:
arrange objects in a virtual space corresponding to map information of a real space, each object of the objects being associated with at least one attribute of a plurality of attributes;
specify an object that satisfies a predetermined positional condition with respect to positional information of the user terminal; and
update information regarding the user based on the at least one attribute of the specified object, wherein
updating the information regarding the use comprises:
referring to a storage that is configured to store character information, the character information including a character and attribute information associated with each other; and
updating the attribute information based on an attribute of the object specified,
the computer is further configured to give a privilege to the user if the attribute information satisfies a privilege condition, and
giving the privilege to the user comprises referring to the storage that is further configured to store history information regarding a history of giving one or more privileges, in order to give the user a privilege different from the one or more privileges in the history information.

11. A non-transitory computer-readable medium storing a video game processing program for causing a computer of a user terminal to perform functions to control progress of a video game, the functions comprising:
arranging objects in a virtual space corresponding to map information of a real space, each object of the objects being associated with at least one attribute of a plurality of attributes;
specifying an object that satisfies a predetermined positional condition with respect to positional information of a user terminal of a user; and
updating information regarding the user based on the at least one attribute associated with the specified object, wherein
updating the information regarding the user comprises:
referring to a storage that is configured to store character information, the character information including a character and attribute information associated with each other; and
updating the attribute information based on an attribute of the object specified,
the functions further comprise giving a privilege to the user if the attribute information satisfies a privilege condition, and
giving the privilege to the user comprises referring to the storage that is further configured to store history information regarding a history of giving one or more privileges, in order to give the user a privilege different from the one or more rivileges in the history information.

* * * * *

UNITED STATES PATENT AND TRADEMARK OFFICE
CERTIFICATE OF CORRECTION

PATENT NO. : 11,654,360 B2
APPLICATION NO. : 17/455964
DATED : May 23, 2023
INVENTOR(S) : Takamasa Shiba et al.

It is certified that error appears in the above-identified patent and that said Letters Patent is hereby corrected as shown below:

In the Claims

| Column | Line | Claim | Reads | Should Read |
|--------|------|-------|-------|-------------|
| 28 | 14 | 10 | "updating the information regarding the use comprises:" | -- updating the information regarding the user comprises: -- |
| 28 | 58 | 11 | "the one or more rivileges" | -- the one or more privileges -- |

Signed and Sealed this
Eleventh Day of July, 2023

Katherine Kelly Vidal
*Director of the United States Patent and Trademark Office*